(12) United States Patent
Suzuki et al.

(10) Patent No.: US 10,355,315 B2
(45) Date of Patent: Jul. 16, 2019

(54) ELECTROCHEMICAL DEVICE AND METHOD OF MANUFACTURING ELECTROCHEMICAL DEVICE

(71) Applicant: TAIYO YUDEN CO., LTD., Taito-ku, Tokyo (JP)

(72) Inventors: Satoshi Suzuki, Takasaki (JP); Tomofumi Akiba, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 95 days.

(21) Appl. No.: 15/438,599

(22) Filed: Feb. 21, 2017

(65) Prior Publication Data

US 2017/0256821 A1 Sep. 7, 2017

(30) Foreign Application Priority Data

Mar. 4, 2016 (JP) .................................. 2016-041766
Dec. 14, 2016 (JP) .................................. 2016-241923

(51) Int. Cl.
*H01G 11/26* (2013.01)
*H01G 11/50* (2013.01)
(Continued)

(52) U.S. Cl.
CPC ........ *H01M 10/0587* (2013.01); *H01G 11/28* (2013.01); *H01G 11/70* (2013.01);
(Continued)

(58) Field of Classification Search
CPC ......... H01M 10/0587; H01M 10/0525; H01M 10/0431; H01G 11/82; H01G 11/74;
(Continued)

(56) References Cited

U.S. PATENT DOCUMENTS

2010/0086843 A1* 4/2010 Kawai ................ H01M 2/0257
                                                          429/163
2011/0183171 A1* 7/2011 Moon ..................... H01M 2/26
                                                           429/94
(Continued)

FOREIGN PATENT DOCUMENTS

JP 2012152810 A 8/2012
JP 2014022179 A 2/2014

*Primary Examiner* — Lisa S Park
(74) *Attorney, Agent, or Firm* — Law Office of Katsuhiro Arai

(57) ABSTRACT

An electrochemical device has a positive-electrode terminal, a negative-electrode terminal, a first electrode body, a second electrode body, and electrolytic solution. The positive-electrode terminal is flat plate-shaped, and has a first principal face and a second principal face on the opposite side. The negative-electrode terminal is flat plate-shaped, and has a third principal face and a fourth principal face on the opposite side. The first electrode body has a first wound positive-electrode non-forming region and a first wound negative-electrode non-forming region. The second electrode body has a second wound positive-electrode non-forming region and a second wound negative-electrode non-forming region. The first wound positive-electrode non-forming region, first wound negative-electrode non-forming region, second wound positive-electrode non-forming region, and second wound negative-electrode non-forming region are joined to the first principal face, third principal face, second principal face, and fourth principal face, respectively.

11 Claims, 28 Drawing Sheets

(51) Int. Cl.
  *H01G 11/52*   (2013.01)
  *H01G 11/70*   (2013.01)
  *H01M 10/0587*  (2010.01)
  *H01M 10/04*   (2006.01)
  *H01M 10/0525*  (2010.01)
  *H01G 11/28*   (2013.01)
  *H01G 11/72*   (2013.01)
  *H01G 11/74*   (2013.01)
  *H01G 11/82*   (2013.01)

(52) U.S. Cl.
  CPC .............. *H01G 11/72* (2013.01); *H01G 11/74* (2013.01); *H01G 11/82* (2013.01); *H01M 10/0431* (2013.01); *H01M 10/0525* (2013.01); *Y02E 60/13* (2013.01)

(58) Field of Classification Search
  CPC ........ H01G 11/72; H01G 11/28; H01G 11/70; Y02E 60/13
  See application file for complete search history.

(56) References Cited

U.S. PATENT DOCUMENTS

2015/0275384 A1* 10/2015 Viavattine ......... H01M 10/0445
                  205/59
2015/0349346 A1* 12/2015 Yushin .................. H01M 4/386
                 429/231.95

* cited by examiner

ELECTROCHEMICAL DEVICE AND METHOD OF MANUFACTURING ELECTROCHEMICAL DEVICE

BACKGROUND

Field of the Invention

The present invention relates to an electrochemical device having an electrode body constituted by a positive electrode, a negative electrode and separators that are wound together, as well as a method of manufacturing such electrochemical device.

Description of the Related Art

There is a demand for lowering the costs of lithium ion capacitors and other new electrochemical devices currently used, in order to create a greater market for these devices. To this end, desirably electrochemical devices use cheaper components and have a structure associated with excellent productivity. In terms of their characteristics, there is also a need for electrochemical devices that are smaller and offer higher capacitance.

One electrochemical device structure consists of a flat-wound electrode body produced by stacking and flat-winding a positive electrode and a negative electrode with a separator in between, and then filling the electrode body in an exterior can together with electrolytic solution. The positive electrode and negative electrode must be joined to a positive-electrode terminal and a negative-electrode terminal, respectively, which are provided on the exterior can.

For example, a secondary battery having a flat-wound electrode body structure, as well as a positive-electrode terminal and a negative-electrode terminal connected to both ends of the winding center axis of the electrode body, respectively, is disclosed in Patent Literature 1. Also, an ultrasonic joining method is disclosed in Patent Literature 2, whereby an ultrasonic horn is sandwiched by two electrode bodies and two current collector terminals are placed on the outer sides of the electrode bodies, with the current collector terminals gripped by an ultrasonic anvil and joined to the electrode bodies, respectively, by means of ultrasonic waves.

BACKGROUND ART LITERATURES

[Patent Literature 1] Japanese Patent Laid-open No. 2014-22179
[Patent Literature 2] Japanese Patent Laid-open No. 2012-152810

SUMMARY

However, the structures described in Patent Literatures 1 and 2 require that two terminals, namely a positive-electrode terminal and a negative-electrode terminal, be joined to one electrode body. In many cases, two electrode bodies are installed in one electrochemical device in order to increase the capacitance of the electrochemical device; in this case, however, four terminals must be joined to the electrode bodies, and this gives rise to a need to reduce the number of parts and joining steps.

In light of the aforementioned situations, an object of the present invention is to provide an electrochemical device that supports capacitance increase and cost reduction, as well as a method of manufacturing such electrochemical device.

Any discussion of problems and solutions involved in the related art has been included in this disclosure solely for the purposes of providing a context for the present invention, and should not be taken as an admission that any or all of the discussion were known at the time the invention was made.

To achieve the aforementioned object, the electrochemical device pertaining to an embodiment of the present invention comprises a positive-electrode terminal, a negative-electrode terminal, a first electrode body, a second electrode body, and electrolytic solution.

The positive-electrode terminal is flat plate-shaped, and has a first principal face and a second principal face on the opposite side of the first principal face.

The negative-electrode terminal is flat plate-shaped, and has a third principal face and a fourth principal face on the opposite side of the third principal face.

The first electrode body comprises: a first positive electrode which has a first positive electrode collector being a metal foil, as well as a first positive-electrode active material layer formed on the first positive-electrode current collect, and on which a first positive-electrode forming region where the first positive-electrode active material layer is formed on the first positive electrode collector, and a first positive-electrode non-forming region where the first positive-electrode active material layer is not formed on the first positive electrode collector, are formed; a first negative electrode which has a first negative electrode collector being a metal foil, as well as a first negative-electrode active material layer formed on the first negative electrode collector, and on which a first negative-electrode forming region where the first negative-electrode active material layer is formed on the first negative electrode collector, and a first negative-electrode non-forming region where the first negative-electrode active material layer is not formed on the first negative electrode collector, are formed; and a first separator which separates the first positive electrode and first negative electrode; wherein the first electrode body is such that the first positive electrode, first negative electrode, and first separator are stacked and wound together, and that it has a first wound positive-electrode non-forming region constituted by the first positive-electrode non-forming region that has been wound, as well as a first wound negative-electrode non-forming region constituted by the first negative-electrode non-forming region that has been wound.

The second electrode body comprises: a second positive electrode which has a second positive electrode collector being a metal foil, as well as a second positive-electrode active material layer formed on the second positive electrode collector, and on which a second positive-electrode forming region where the second positive-electrode active material layer is formed on the second positive electrode collector, and a second positive-electrode non-forming region where the second positive-electrode active material layer is not formed on the second positive electrode collector, are formed; a second negative electrode which has a second negative electrode collector being a metal foil, as well as a second negative-electrode active material layer formed on the second negative electrode collector, and on which a second negative-electrode forming region where the second negative-electrode active material layer is formed on the second negative electrode collector, and a second negative-electrode non-forming region where the second negative-electrode active material layer is not formed on the second negative electrode collector, are formed; and a second separator which separates the second positive electrode and second negative electrode; wherein the second electrode body is such that the second positive electrode, second negative electrode, and second separator are stacked and wound together, and that it has a second wound positive-electrode non-forming region constituted by the second positive-electrode non-forming region that has been wound, as well as a second wound negative-electrode non-forming region constituted by the second negative-electrode non-forming region that has been wound.

The electrolytic solution immerses the first electrode body and second electrode body.

The first wound positive-electrode non-forming region is joined to the first principal face, the first wound negative-electrode non-forming region is joined to the third principal face, the second wound positive-electrode non-forming region is joined to the second principal face, and the second wound negative-electrode non-forming region is joined to the fourth principal face.

According to this constitution, the electrochemical device has two electrode bodies, namely the first electrode body and second electrode body, and therefore the capacitance of the electrochemical device can be increased. Also, the positive-electrode terminal and negative-electrode terminal can be made flat plate-shaped, to allow for simplification of the structure and reduction of the cost of parts.

The first electrode body may have a flat-wound structure constituted by the first positive electrode, first negative electrode, and first separator that are wound together into a first wound body shaped like a flat sheet, while the second electrode body may have a flat-wound structure constituted by the second positive electrode, second negative electrode, and second separator that are wound together into a second wound body shaped like a flat sheet.

The first electrode body may further have two lithium ion supply sources that are joined to the top face and bottom face of the first wound body, respectively, while the second electrode body may further have two lithium ion supply sources that are joined to the top face and bottom face of the second wound body, respectively.

By placing separate lithium ion supply sources on both the top and bottom faces of the wound bodies having a flat-wound structure, the efficiency of vertical doping of lithium ions can be improved, while excellent productivity can be achieved.

To achieve the aforementioned object, the method of manufacturing an electrochemical device pertaining to an embodiment of the present invention comprising: preparing a positive-electrode terminal which is flat plate-shaped, and has a first principal face and a second principal face on the opposite side of the first principal face; a negative-electrode terminal which is flat plate-shaped, and has a third principal face and a fourth principal face on the opposite side of the third principal face; a first electrode body comprising: a first positive electrode which has a first positive electrode collector being a metal foil, as well as a first positive-electrode active material layer formed on the first positive electrode collector, and on which a first positive-electrode forming region where the first positive-electrode active material layer is formed on the first positive electrode collector, and a first positive-electrode non-forming region where the first positive-electrode active material layer is not formed on the first positive electrode collector, are formed; a first negative electrode which has a first negative electrode collector being a metal foil, as well as a first negative-electrode active material layer formed on the first negative electrode collector, and on which a first negative-electrode forming region where the first negative-electrode active material layer is formed on the first negative electrode collector, and a first negative-electrode non-forming region where the first negative-electrode active material layer is not formed on the first negative electrode collector, are formed; and a first separator which separates the first positive electrode and first negative electrode; wherein the first electrode body is such that the first positive electrode, first negative electrode, and first separator are stacked and wound together, and that it has a first wound positive-electrode non-forming region constituted by the first positive-electrode non-forming region that has been wound, as well as a first wound negative-electrode non-forming region constituted by the first negative-electrode non-forming region that has been wound; and a second electrode body comprising: a second positive electrode which has a second positive electrode collector being a metal foil, as well as a second positive-electrode active material layer formed on the second positive electrode collector, and on which a second positive-electrode forming region where the second positive-electrode active material layer is formed on the second positive electrode collector, and a second positive-electrode non-forming region where the second positive-electrode active material layer is not formed on the second positive electrode collector, are formed; a second negative electrode which has a second negative electrode collector being a metal foil, as well as a second negative-electrode active material layer formed on the second negative electrode collector, and on which a second negative-electrode forming region where the second negative-electrode active material layer is formed on the second negative electrode collector, and a second negative-electrode non-forming region where the second negative-electrode active material layer is not formed on the second negative electrode collector, are formed; and a second separator which separates the second positive electrode and second negative electrode; wherein the second electrode body is such that the second positive electrode, second negative electrode, and second separator are stacked and wound together, and that it has a second wound positive-electrode non-forming region constituted by the second positive-electrode non-forming region that has been wound, as well as a second wound negative-electrode non-forming region constituted by the second negative-electrode non-forming region that has been wound.

The first wound positive-electrode non-forming region is joined to the first principal face, and the second wound positive-electrode non-forming region is joined to the second principal face.

The first wound negative-electrode non-forming region is joined to the third principal face, and the second wound negative-electrode non-forming region is joined to the fourth principal face.

According to this manufacturing method, the first wound positive-electrode non-forming region and second wound positive-electrode non-forming region can be simultaneously joined to both the top face and bottom face of the positive-electrode terminal, respectively, while the first wound negative-electrode non-forming region and second wound negative-electrode non-forming region can be simultaneously joined to both the top face and bottom face of the negative-electrode terminal, respectively. Since there is no need to join the first wound positive-electrode non-forming region and second wound positive-electrode non-forming region to the positive-electrode terminal, respectively, or join the first wound negative-electrode non-forming region and second wound negative-electrode non-forming region to the negative-electrode terminal, the manufacturing process can be simplified and the manufacturing cost can be reduced.

In the step to join the first wound positive-electrode non-forming region to the first principal face and join the second wound positive-electrode non-forming region to the second principal face, and in the step to join the first wound negative-electrode non-forming region to the third principal face and join the second wound negative-electrode non-forming region to the fourth principal face, the joining may be performed by means of ultrasonic joining.

In the step to join the first wound positive-electrode non-forming region to the first principal face and join the second wound positive-electrode non-forming region to the second principal face, the first wound positive-electrode non-forming region and second wound positive-electrode non-forming region may be gripped by ultrasonic joining equipment to join the first wound positive-electrode non-forming region to the first principal face and join the second wound positive-electrode non-forming region to the second principal face; whereas, in the step to join the first wound negative-electrode non-forming region to the third principal face and join the second wound negative-electrode non-forming region to the fourth principal face, the first wound negative-electrode non-forming region and second wound negative-electrode non-forming region may be gripped by ultrasonic joining equipment to join the first wound negative-electrode non-forming region to the third principal face and join the second wound negative-electrode non-forming region to the fourth principal face.

According to this constitution, the first wound positive-electrode non-forming region and second wound positive-electrode non-forming region can be gripped by ultrasonic joining equipment to join the first wound positive-electrode non-forming region and second wound positive-electrode non-forming region simultaneously to the top and bottom faces of the positive-electrode terminal, while the first wound negative-electrode non-forming region and second wound negative-electrode non-forming region can be gripped by ultrasonic joining equipment to join the first wound negative-electrode non-forming region and second wound negative-electrode non-forming region simultaneously to the top and bottom faces of the negative-electrode terminal.

To achieve the aforementioned object, the electrochemical device pertaining to the first embodiment of the present invention has a positive-electrode terminal, a negative-electrode terminal, a first electrode body, a second electrode body, and electrolytic solution.

The positive-electrode terminal is plate-shaped, and has a first principal face and a second principal face on the opposite side of the first principal face.

The negative-electrode terminal is plate-shaped, and has a third principal face and a fourth principal face on the opposite side of the third principal face.

The first electrode body comprises: a first positive electrode which has a first positive electrode collector being a metal foil, as well as a first positive-electrode active material layer formed on the first positive electrode collector, and on which a first positive-electrode forming region where the first positive-electrode active material layer is formed on the first positive electrode collector, and a first positive-electrode non-forming region where the first positive-electrode active material layer is not formed on the first positive electrode collector, are formed; a first negative electrode which has a first negative electrode collector being a metal foil, as well as a first negative-electrode active material layer formed on the first negative electrode collector, and on which a first negative-electrode forming region where the first negative-electrode active material layer is formed on the first negative electrode collector, and a first negative-electrode non-forming region where the first negative-electrode active material layer is not formed on the first negative electrode collector, are formed; and a first separator which separates the first positive electrode and first negative electrode; wherein the first electrode body is such that the first positive electrode, first negative electrode, and first separator are stacked and wound together, and that it has a first wound positive-electrode non-forming region constituted by the first positive-electrode non-forming region that has been wound, as well as a first wound negative-electrode non-forming region constituted by the first negative-electrode non-forming region that has been wound.

The second electrode body comprises: a second positive electrode which has a second positive electrode collector being a metal foil, as well as a second positive-electrode active material layer formed on the second positive electrode collector, and on which a second positive-electrode forming region where the second positive-electrode active material layer is formed on the second positive electrode collector, and a second positive-electrode non-forming region where the second positive-electrode active material layer is not formed on the second positive electrode collector, are formed; a second negative electrode which has a second negative electrode collector being a metal foil, as well as a second negative-electrode active material layer formed on the second negative electrode collector, and on which a second negative-electrode forming region where the second negative-electrode active material layer is formed on the second negative electrode collector, and a second negative-electrode non-forming region where the second negative-electrode active material layer is not formed on the second negative electrode collector, are formed; and a second separator which separates the second positive electrode and second negative electrode; wherein the second electrode body is such that the second positive electrode, second negative electrode, and second separator are stacked and wound together, and that it has a second wound positive-electrode non-forming region constituted by the second positive-electrode non-forming region that has been wound, as well as a second wound negative-electrode non-forming region constituted by the second negative-electrode non-forming region that has been wound.

The electrolytic solution immerses the first electrode body and second electrode body.

The first wound positive-electrode non-forming region is joined to the first principal face, the first wound negative-electrode non-forming region is joined to the third principal face, the second wound positive-electrode non-forming region is joined to the second principal face, and the second wound negative-electrode non-forming region is joined to the fourth principal face.

The positive-electrode terminal has: an electrode body joint part to which the first wound positive-electrode non-forming region and second wound positive-electrode non-forming region are joined and which has a first width and a first thickness; an external terminal part which projects outward from a housing space housing the first electrode body, second electrode body, and electrolytic solution and which has a second width and a second thickness; and a relay part which connects the electrode body joint part and external terminal part and which has a third width and a third thickness; wherein the first width may be greater than the third width, the second width may be greater than the first width, the first thickness may be greater than the second thickness, and the third thickness may be greater than the first thickness.

According to this constitution, it is possible to satisfy the requirements for the respective parts of the positive-electrode terminal, while at the same time reducing the differences among the cross-section areas of the respective parts and also reducing the differences among the electrical resistances at the respective parts.

The negative-electrode terminal has: an electrode body joint part to which the first wound negative-electrode non-forming region and second wound negative-electrode non-forming region are joined and which has a first width and a first thickness; an external terminal part which projects outward from a housing space housing the first electrode body, second electrode body, and electrolytic solution and which has a second width and a second thickness; and a relay part which connects the electrode body joint part and external terminal part and which has a third width and a third thickness; wherein the first width may be greater than the third width, the second width may be greater than the first width, the first thickness may be greater than the second thickness, and the third thickness may be greater than the first thickness.

According to this constitution, it is possible to satisfy the requirements for the respective parts of the negative-electrode terminal, while at the same time reducing the differences among the cross-section areas of the respective parts and also reducing the differences among the electrical resistances at the respective parts.

The positive-electrode terminal has: an electrode body joint part to which the first wound positive-electrode non-forming region and second wound positive-electrode non-forming region are joined and which has a first width and a first thickness; an external terminal part which projects outward from the housing space housing the first electrode body, second electrode body and electrolytic solution and which has a second width and a second thickness; and a relay part which connects the electrode body joint part and external terminal part and which has a third width and a third thickness; wherein the first width may be greater than the third width, the second width may be greater than the first width, the first thickness may be greater than the second thickness, and the third thickness is greater than the first thickness; whereas, the negative-electrode terminal has: an electrode body joint part to which the first wound negative-electrode non-forming region and second wound negative-electrode non-forming region are joined and which has a fourth width and a fourth thickness; an external terminal part which projects outward from the housing space housing the first electrode body, second electrode body, and electrolytic solution and which has a fifth width and a fifth thickness; and a relay part which connects the electrode body joint part and external terminal part and which has a sixth width and a sixth thickness; wherein the fourth width may be greater than the sixth width, the fifth width may be greater than the fourth width, the fourth thickness may be greater than the fifth thickness, and the sixth thickness may be greater than the fourth thickness.

According to this constitution, it is possible to satisfy the requirements for the respective parts of the positive-electrode terminal and negative-electrode terminal, while at the same time reducing the differences among the cross-section areas of the respective parts and also reducing the differences among the electrical resistances at the respective parts.

As for the positive-electrode terminal, the electrode body joint part, external terminal part, and relay part may all have the same cross-section area.

As for the negative-electrode terminal, the electrode body joint part, external terminal part, and relay part may all have the same cross-section area.

As described above, according to the present invention an electrochemical device that supports capacitance increase and cost reduction, as well as a method of manufacturing such electrochemical device, can be provided.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

DESCRIPTION OF THE SYMBOLS 100, 400—Electrochemical device
101—First electrode body
102—Second electrode body
103, 403—Positive-electrode terminal
104, 404—Negative-electrode terminal
120—Electrode body
121—Wound electrode region
122—Wound positive-electrode non-forming region
123—Wound negative-electrode non-forming region
130—Positive electrode
131—Positive electrode collector
132—Positive-electrode active material layer
140—Negative electrode
141—Negative electrode collector
142—Negative-electrode active material layer
150—Separator
160—Lithium ion supply source
170—Wound body

DETAILED DESCRIPTION OF EMBODIMENTS (First Embodiment)

The first embodiment of the present invention is explained.

[Structure of Electrochemical Device]

Figure 1:
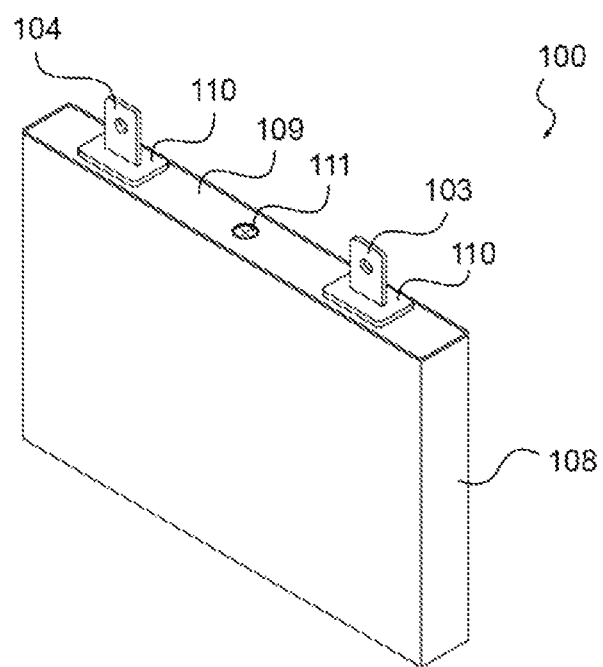
FIG. 1 is a perspective view of an electrochemical device pertaining to the first embodiment of the present invention.
Figure 2:
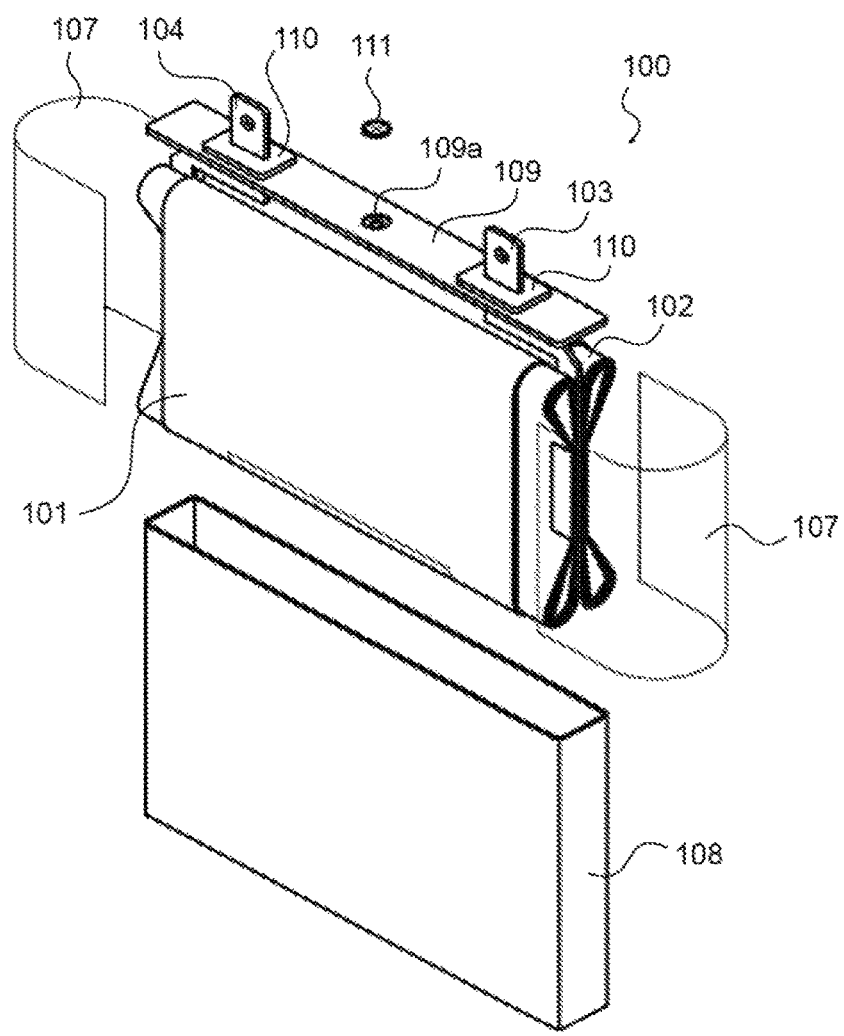
FIG. 2 is an exploded perspective view of the same electrochemical device.
Figure 3:
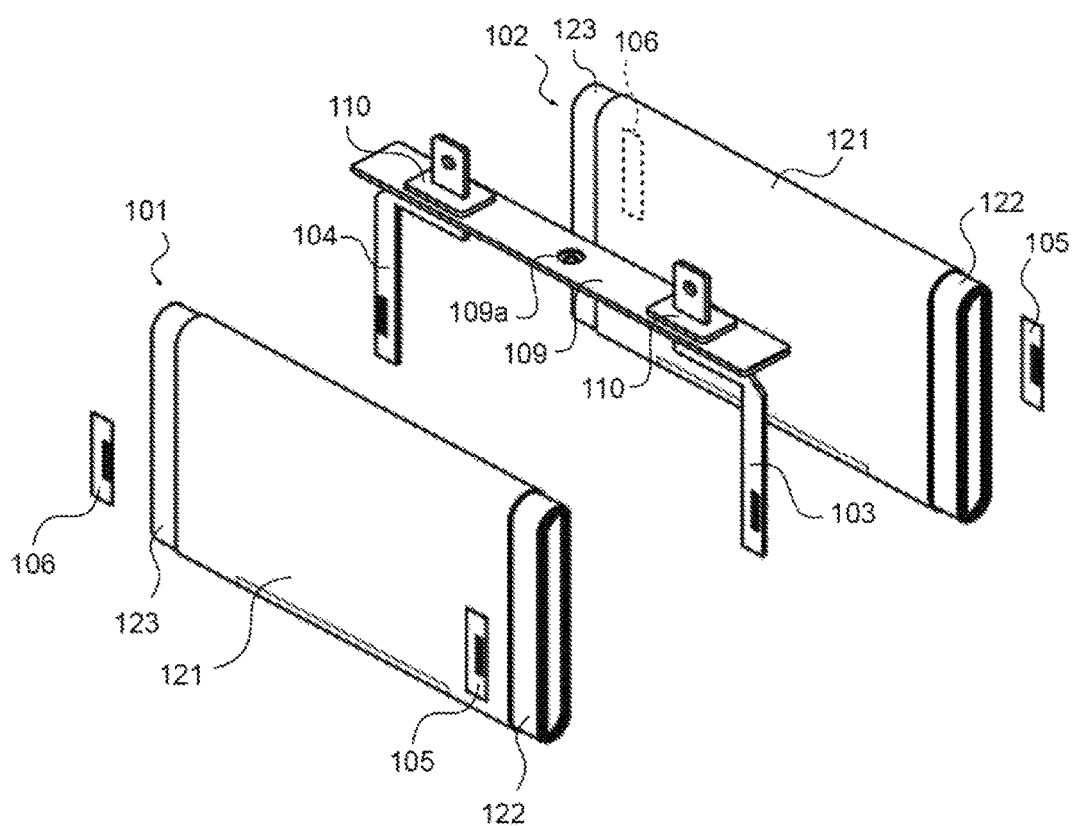
FIG. 3 is an exploded perspective view of the same electrochemical device.

FIG. 1 is a perspective view of an electrochemical device 100 pertaining to the first embodiment, while FIGS. 2 and 3 are exploded perspective views of the electrochemical device 100.

The electrochemical device 100 may be a lithium ion capacitor. Also, the electrochemical device 100 may be an electric double-layer capacitor or other type of capacitor, or lithium ion battery, nickel hydrogen battery, or other battery. In addition to the above, the electrochemical device 100 may be any type of electrochemical device that can be achieved based on the structure below. In the explanation below, the electrochemical device 100 is a lithium ion capacitor.

As shown in FIGS. 2 and 3, the electrochemical device 100 has a first electrode body 101, a second electrode body 102, a positive-electrode terminal 103, a negative-electrode terminal 104, a positive-electrode terminal plate 105, a negative-electrode terminal plate 106, insulation films 107, an exterior can 108, and a lid member 109.

As shown in FIGS. 2 and 3, the positive-electrode terminal 103 and negative-electrode terminal 104 are installed on the lid member 109, while the first electrode body 101 and second electrode body 102 are both joined to the positive-electrode terminal 103 and negative-electrode terminal 104. The first electrode body 101 and second electrode body 102 have their ends covered by the insulation films 107, and are housed in the exterior can 108.

As shown in FIG. 1, the exterior can 108 and lid member 109 are joined together to constitute the electrochemical device 100. Electrolytic solution is filled in the space formed by the exterior can 108 and lid member 109 (hereinafter referred to as "housing space"), and the first electrode body 101 and second electrode body 102 are immersed in the electrolytic solution.

Figure 4:
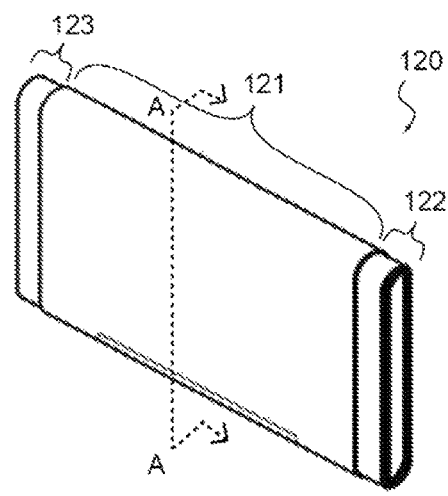
FIG. 4 is a perspective view of the electrode body provided in the same electrochemical device.

The first electrode body 101 and second electrode body 102 have the same structure. FIG. 4 is a perspective view of an electrode body 120 used as the first electrode body 101 and second electrode body 102. As shown in this figure, the electrode body 120 has a wound electrode region 121, a wound positive-electrode non-forming region 122, and a wound negative-electrode non-forming region 123.

Figure 5:
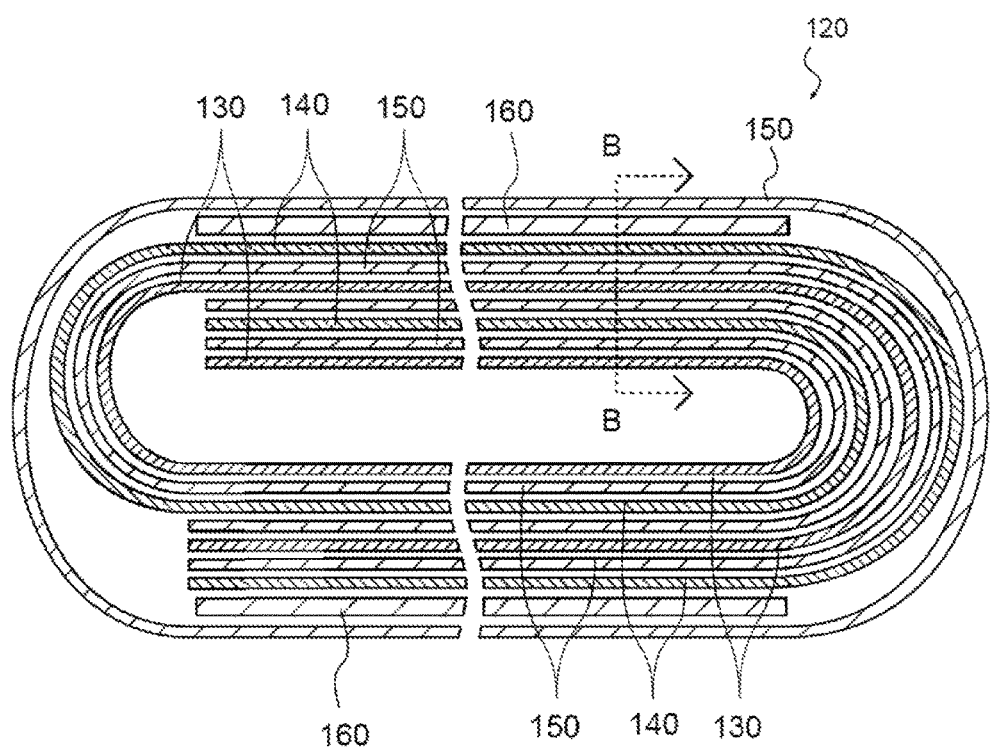
FIG. 5 is a section view of the electrode body provided in the same electrochemical device.
Figure 6:
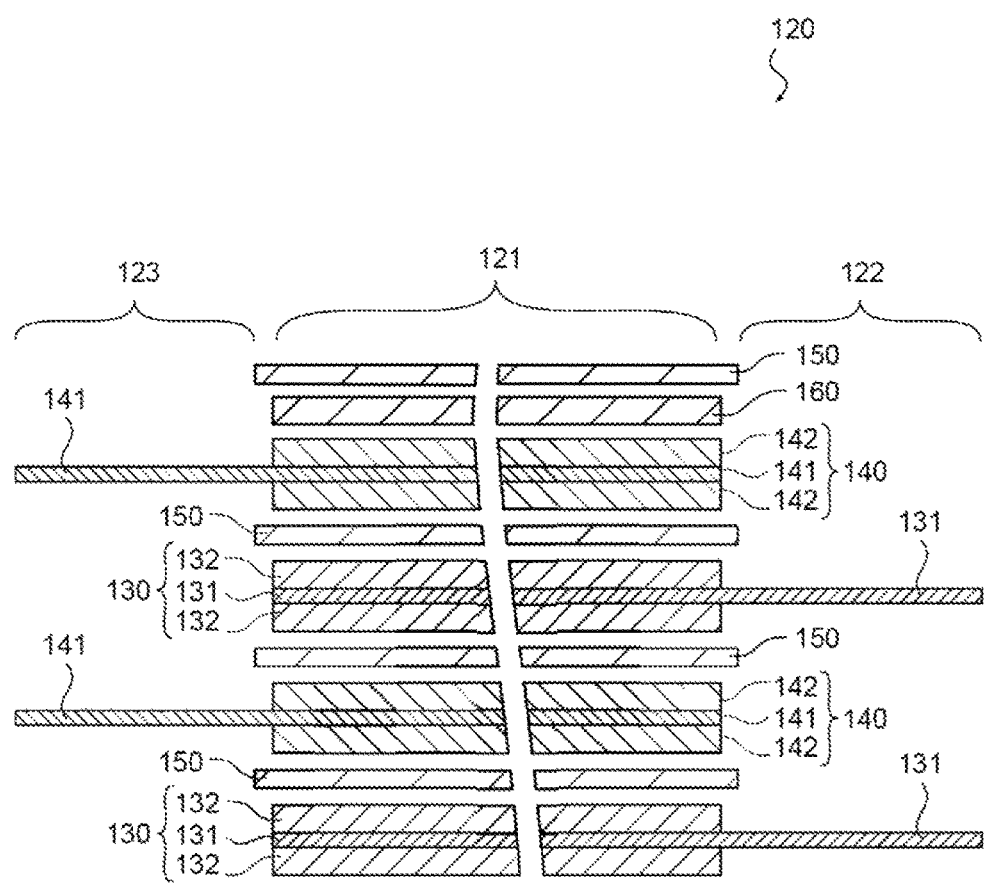
FIG. 6 is a section view of the electrode body provided in the same electrochemical device.

FIG. 5 is a section view of the electrode body 120, or specifically a section view of FIG. 4 along line A-A. FIG. 6 is a section view of the electrode body 120, or specifically a section view of FIG. 5 along line B-B. As shown in these figures, the electrode body 120 has a positive electrode 130, a negative electrode 140, separators 150, and lithium ion supply sources 160. It should be noted that the numbers of positive electrode 130 layers, negative electrode 140 layers and separator 150 layers shown in FIGS. 5 and 6 are for the purpose of schematic representation and in reality there are more layers. For example, there may be 21 positive electrode 130 layers and 23 negative-electrode 140 layers.

Figure 7:
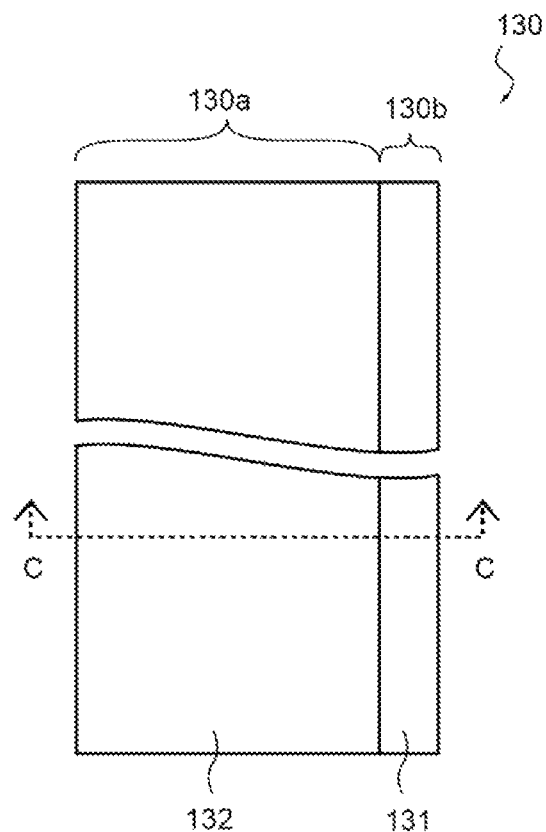
FIG. 7 is a plan view of the positive electrode of the electrode body provided in the same electrochemical device.
Figure 8:
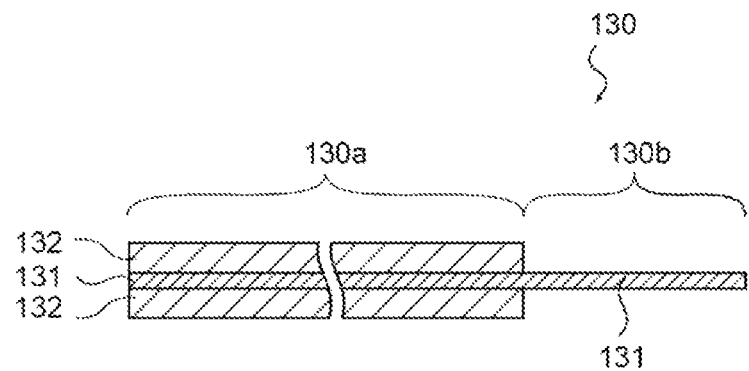
FIG. 8 is a section view of the positive electrode of the electrode body provided in the same electrochemical device.

FIG. 7 is a plan view of the positive electrode 130 before winding. FIG. 8 is a section view of the positive electrode 130, or specifically a section view of FIG. 7 along line C-C. As shown in this figure, the positive electrode 130 has a positive electrode collector 131 and a positive-electrode active material layer 132.

The positive electrode collector 131 is a metal foil and made of aluminum, for example. Pores through which ions can pass are provided in the positive electrode collector 131, and the pores may be formed in the foil by means of electrolytic etching, etc. The thickness of the positive electrode collector 131 is 0.02 mm, for example.

The positive-electrode active material layer 132 may be a mixture of positive-electrode active material and binder resin, and may further contain a conductive aid. The positive-electrode active material is a material capable of adsorbing the lithium ions and anions in the electrolytic solution, where examples include active carbon, polyacene carbide, and the like.

For the binder resin, any synthetic resin that joins the positive-electrode active material may be used, such as styrene butadiene rubber, polyethylene, polypropylene, polyethylene terephthalate, aromatic polyamide, carboxy methyl cellulose, fluororubber, polyvinylidene fluoride, isoprene rubber, butadiene rubber, and ethylene propylene rubber, for example.

The conductive aid is constituted by grains made of conductive material, and improves the conductivity between positive-electrode active materials. The conductive aid may be graphite, carbon black, or other carbon material, for example. Any of these may be used alone or multiple types may be mixed. It should be noted that the conductive aid may be a material having conductivity, such as metal material and conductive polymer, among others.

As shown in FIG. 8, the positive-electrode active material layer 132 is formed on both the top face and bottom face of the positive electrode collector 131. Here, the positive-electrode active material layer 132 is not formed over the entire surface of the positive electrode collector 131; instead, a region where the positive-electrode active material layer 132 is not formed, is provided in one part of the positive electrode collector 131.

In the positive electrode 130, the region where the positive-electrode active material layer 132 is provided on the positive electrode collector 131 is hereinafter referred to as "positive-electrode forming region 130a," while the region where the positive-electrode active material layer 132 is not provided and the positive electrode collector 131 is exposed is referred to as "positive-electrode non-forming region 130b." As shown in FIG. 7, the positive-electrode non-forming region 130b is provided in a belt shape along one side of the positive electrode 130.

Figure 9:
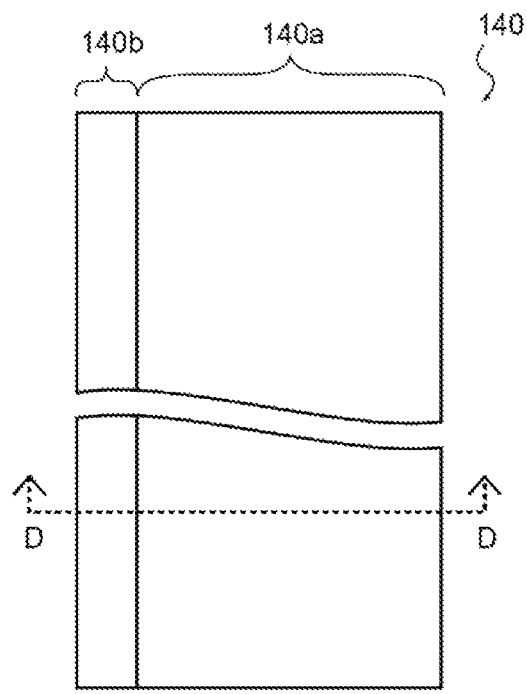
FIG. 9 is a plan view of the negative electrode of the electrode body provided in the same electrochemical device.
Figure 10:
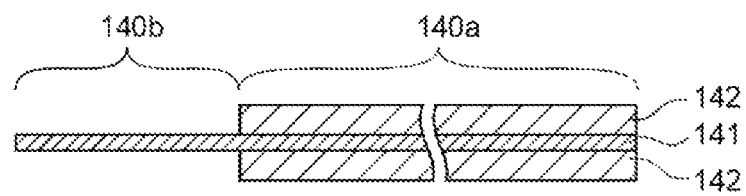
FIG. 10 is a plan view of the negative electrode of the electrode body provided in the same electrochemical device.

FIG. 9 is a plan view of the negative electrode 140 before winding. FIG. 10 is a section view of the negative electrode 140, or specifically a section view of FIG. 9 along line D-D. As shown in this figure, the negative electrode 140 has a negative electrode collector 141 and a negative-electrode active material layer 142.

The negative electrode collector 141 is a metal foil and made of copper, for example. Pores through which ions can pass are provided in the negative electrode collector 141, and the pores may be formed in the foil by means of electrolytic etching, etc. The thickness of the negative electrode collector 141 is 0.01 mm, for example.

The negative-electrode active material layer 142 may be a mixture of negative-electrode active material and binder resin, and may further contain a conductive aid. The negative-electrode active material is a material capable of occluding the lithium ions in the electrolytic solution, where non-graphitizable carbon (hard carbon), graphite, soft carbon, or other carbon material can be used, for example.

For the binder resin, any synthetic resin that joins the negative-electrode active material may be used, such as styrene butadiene rubber, polyethylene, polypropylene, polyethylene terephthalate, aromatic polyamide, carboxy methyl cellulose, fluororubber, polyvinylidene fluoride, isoprene rubber, butadiene rubber, and ethylene propylene rubber, for example.

The conductive aid is constituted by grains made of conductive material, and improves the conductivity between negative-electrode active materials. The conductive aid may be graphite, carbon black, or other carbon material, for example. Any of these may be used alone or multiple types may be mixed. It should be noted that the conductive aid may be a material having conductivity, such as metal material and conductive polymer, among others.

As shown in FIG. 10, the negative-electrode active material layer 142 is formed on both the top face and bottom face of the negative electrode collector 141. Here, the negative-electrode active material layer 142 is not formed over the entire surface of the negative electrode collector 141; instead, a region where the negative-electrode active material layer 142 is not formed, is provided in one part of the negative electrode collector 141.

In the negative electrode 140, the region where the negative-electrode active material layer 142 is provided on the negative electrode collector 141 is hereinafter referred to as "negative-electrode forming region 140a," while the region where the negative-electrode active material layer 142 is not provided and the negative electrode collector 141 is exposed is referred to as "negative-electrode non-forming region 140b." As shown in FIG. 9, the negative-electrode non-forming region 140b is provided in a belt shape along one side of the negative electrode 140.

The separator 150 separates the positive electrode 130 and negative electrode 140, while letting the ions contained in the electrolytic solution described below pass through it. The separator 150 may be a woven fabric, non-woven fabric, or porous synthetic resin film, etc., where examples include materials whose primary component is polyethylene resin.

Figure 11:
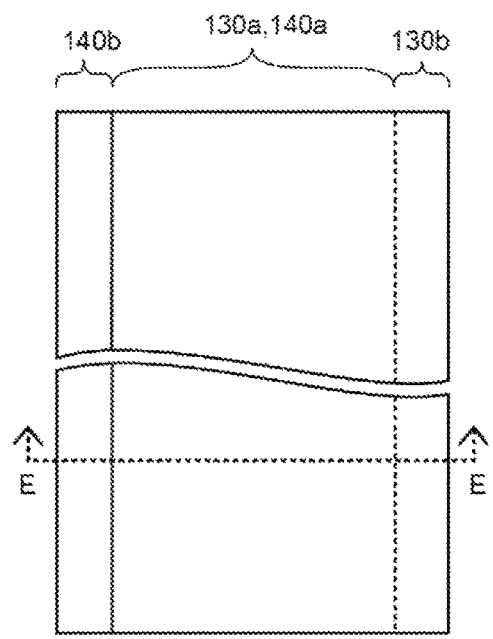
FIG. 11 is a plan view of the positive electrode and negative electrode of the electrode body provided in the same electrochemical device.
Figure 12:
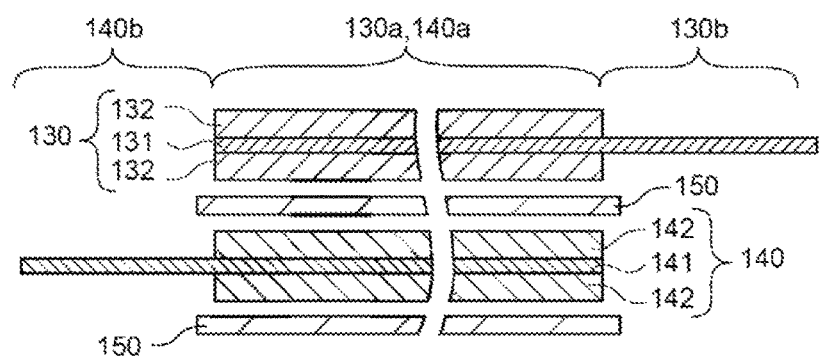
FIG. 12 is a section view of the positive electrode and negative electrode of the electrode body provided in the same electrochemical device.

The electrode body 120 is constituted by the positive electrode 130, negative electrode 140, and separators 150 that are stacked and wound together. FIG. 11 is a plan view of the laminate formed by stacking the foregoing. FIG. 12 is a section view of the laminate, or specifically a section view of FIG. 11 along line E-E. It should be noted that the separators 150 are not shown in FIG. 11.

As shown in FIG. 12, the positive electrode 130, negative electrode 140, and separators 150 are stacked together so that a separator 150 is positioned between the positive electrode 130 and negative electrode 140. Here, as shown in FIG. 11, the positive electrode 130 and negative electrode 140 are placed with an offset in such a way that the positive-electrode forming region 130a and negative-electrode forming region 140a face each other, while the positive-electrode non-forming region 130b and negative-electrode non-forming region 140b do not face each other. The separators 150 are placed so that the positive-electrode forming region 130a and negative-electrode forming region 140a are separated.

Figure 13:
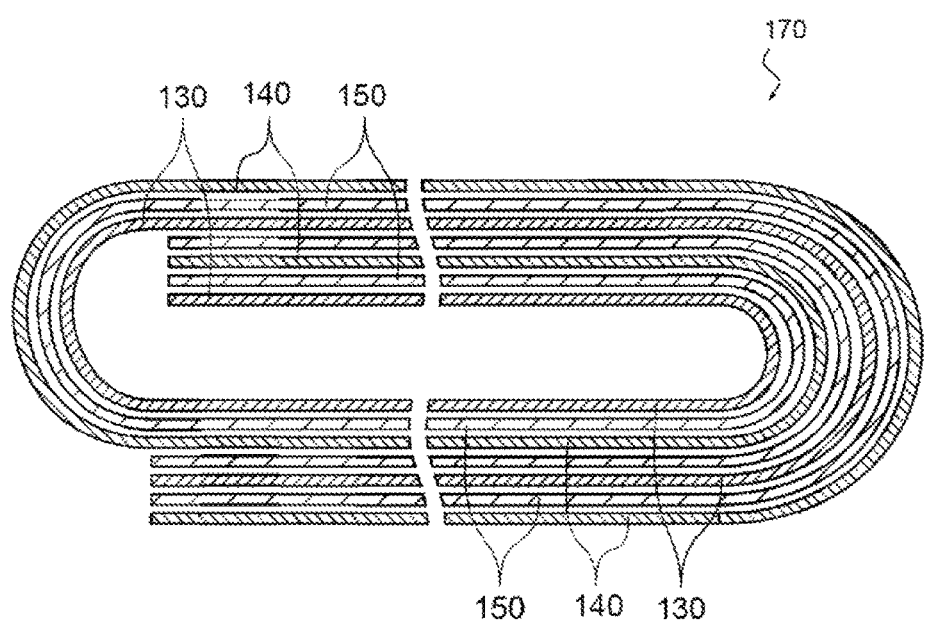
FIG. 13 is a schematic view showing the lithium ion supply source of the electrode body provided in the same electrochemical device.

This laminate is wound and flattened to form a wound body 170. FIG. 13 is a section view of the wound body 170. The size of the wound body 170 may be 115 mm in length, 67 mm in width, and 5.5 mm in thickness, for example.

As shown in FIG. 5, the electrode body 120 has two lithium ion supply sources 160. The lithium ion supply source 160 is constituted by a copper foil or other metal foil and a lithium metal attached to the outer face thereof, where the lithium metal is attached so that it faces the negative electrode 140. One lithium ion supply source 160 is attached to the top face, and another, to the bottom face, of the wound body 170 shown in FIG. 13. A part of the wound body 170, and the lithium ion supply sources 160, are covered by the separators 150.

The electrode body 120 has the aforementioned constitution. The wound electrode region 121 is the part of the electrode body 120 where the positive-electrode forming region 130a, negative-electrode forming region 140a, and separators 150 are wound together. The wound positive-electrode non-forming region 122 is the part of the electrode body 120 where the positive-electrode non-forming region 130b is wound, or specifically where the positive electrode collector 131 alone is wound. The wound negative-electrode non-forming region 123 is the part of the first electrode body 101 where the negative-electrode non-forming region 140b is wound, or specifically where the negative electrode collector 141 alone is wound.

The first electrode body 101 and second electrode body 102 both have the constitution of the electrode body 120. This means that, as shown in FIG. 3, the first electrode body 101 and second electrode body 102 have their own wound electrode region 121, wound positive-electrode non-forming region 122, and wound negative-electrode non-forming region 123, respectively.

Figure 14:
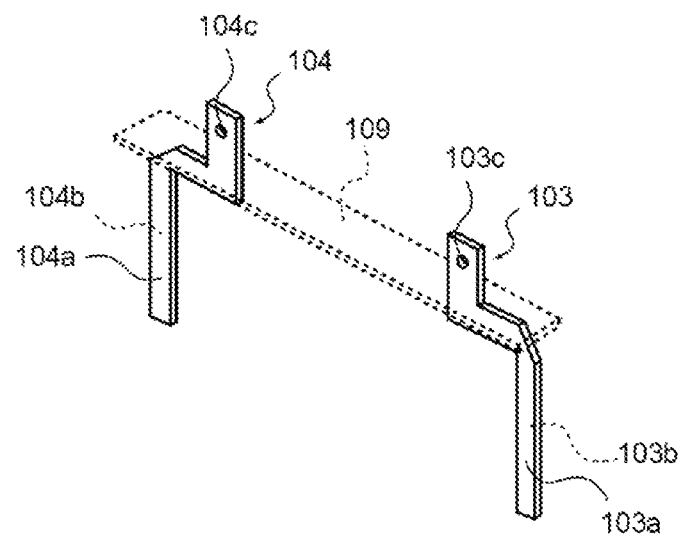
FIG. 14 is a perspective view of the positive-electrode terminal and negative-electrode terminal provided in the same electrochemical device.
Figure 15:
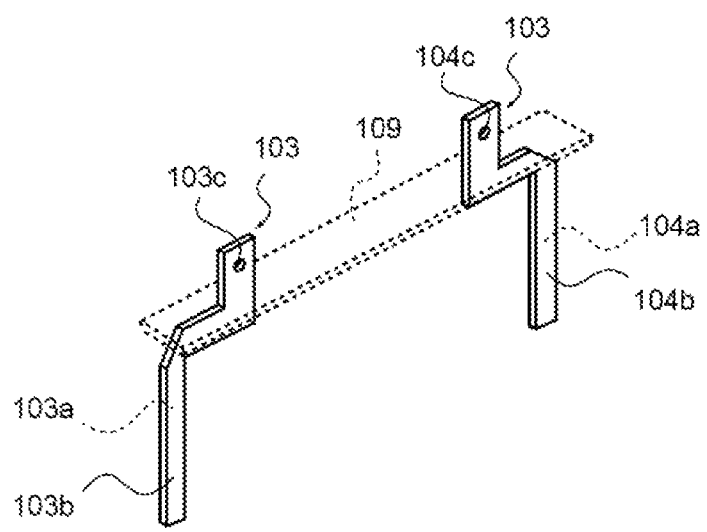
FIG. 15 is a perspective view of the positive-electrode terminal and negative-electrode terminal provided in the same electrochemical device.

The positive-electrode terminal 103 and negative-electrode terminal 104 are installed on the lid member 109. FIGS. 14 and 15 are perspective views of the positive-electrode terminal 103 and negative-electrode terminal 104, respectively.

The positive-electrode terminal 103 is a plate-shaped member made of metal. The positive-electrode terminal 103 may be made of aluminum (A1050-H24), for example. The thickness of the positive-electrode terminal 103 is 1.5 mm, for example. As shown in FIG. 3, the positive-electrode terminal 103 is inserted into the lid member 109, and insulated from the lid member 109 by a terminal support member 110 made of synthetic resin, etc. This way, the positive-electrode terminal 103 is partially housed in the housing space, and partially projecting out of the housing space.

As shown in FIGS. 14 and 15, one principal face of the positive-electrode terminal 103 is referred to as "first principal face 103a," while the principal face on the opposite side is referred to as "second principal face 103b." The positive-electrode terminal 103 has a through hole 103c provided in it, which connects to the first principal face 103a and second principal face 103b and is used for connecting an external device, etc. The shape of the positive-electrode terminal 103 is not limited in any way, so long as it is a sheet shape. For example, the positive-electrode terminal 103 may be shaped so that it has rectangular principal faces.

The negative-electrode terminal 104 is a plate-shaped member made of metal. The negative-electrode terminal 104 may be made of copper (C1100-1/4H), for example. The thickness of the negative-electrode terminal 104 is 1.2 mm, for example. As shown in FIG. 3, the negative-electrode terminal 104 is inserted into the lid member 109, and insulated from the lid member 109 by a terminal support member 110 made of synthetic resin, etc. This way, the negative-electrode terminal 104 is partially housed in the housing space, and partially projecting out of the housing space.

As shown in FIGS. 14 and 15, one principal face of the negative-electrode terminal 104 is referred to as "third principal face 104a," while the principal face on the opposite side is referred to as "fourth principal face 104b." The negative-electrode terminal 104 has a through hole 104c provided in it, which connects to the third principal face 104a and fourth principal face 104b and is used for connecting an external device, etc. The shape of the negative-electrode terminal 104 is not limited in any way, so long as it is a plate shape. For example, the negative-electrode terminal 104 may be shaped so that it has rectangular principal faces.

The positive-electrode terminal 103 and negative-electrode terminal 104 are placed in such a way that the first principal face 103a and third principal face 104a are positioned in the same plane, while the second principal face 103b and fourth principal face 104b are positioned in the same plane.

The positive-electrode terminal plate 105 is a plate-shaped member made of metal. The electrochemical device 100 has two positive-electrode terminal plates 105 that are joined to the first electrode body 101 and second electrode body 102, respectively, as shown in FIG. 3. The positive-electrode terminal plate 105 is made of aluminum (A1050-H24), for example, and its size is 40 mm in length, 7.5 mm in width, and 0.2 mm in thickness, for example.

The negative-electrode terminal plate 106 is a plate-shaped member made of metal. The electrochemical device 100 has two negative-electrode terminal plates 106 that are joined to the first electrode body 101 and second electrode body 102, respectively, as shown in FIG. 3. The negative-electrode terminal plate 106 is made of copper (C1100-1/4H), for example, and its size is 40 mm in length, 7.5 mm in width, and 0.2 mm in thickness, for example.

Figure 16:
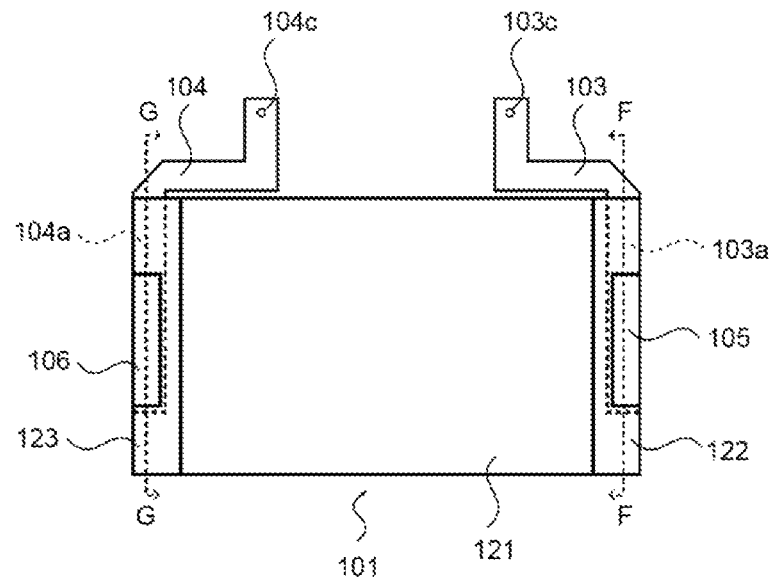
FIG. 16 is a plan view of the first electrode body, positive-electrode terminal, and negative-electrode terminal provided in the same electrochemical device.

As shown in FIG. 3, the first electrode body 101 and second electrode body 102 are facing each other via the positive-electrode terminal 103 and negative-electrode terminal 104, and joined to the positive-electrode terminal 103 and negative-electrode terminal 104. FIG. 16 is a schematic view showing the joining mode of the positive-electrode terminal 103 and negative-electrode terminal 104 with the first electrode body 101, while FIG. 17 is a schematic view showing the joining mode of the positive-electrode terminal 103 and negative-electrode terminal 104 with the second electrode body 102.

Figure 17:
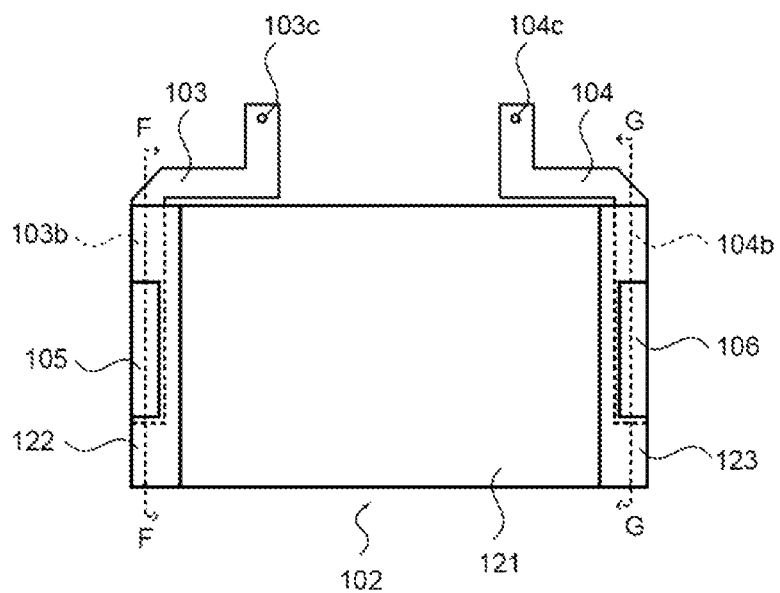
FIG. 17 is a plan view of the second electrode body, positive-electrode terminal, and negative-electrode terminal provided in the same electrochemical device.
Figure 18:
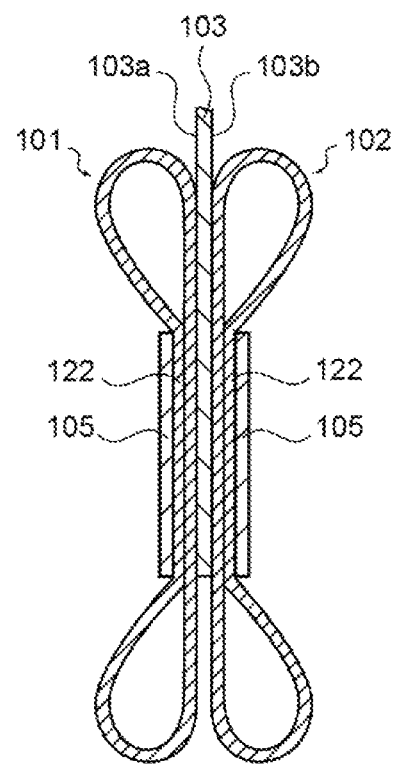
FIG. 18 is a section view of the first electrode body, second electrode body, and positive-electrode terminal provided in the same electrochemical device.
Figure 19:
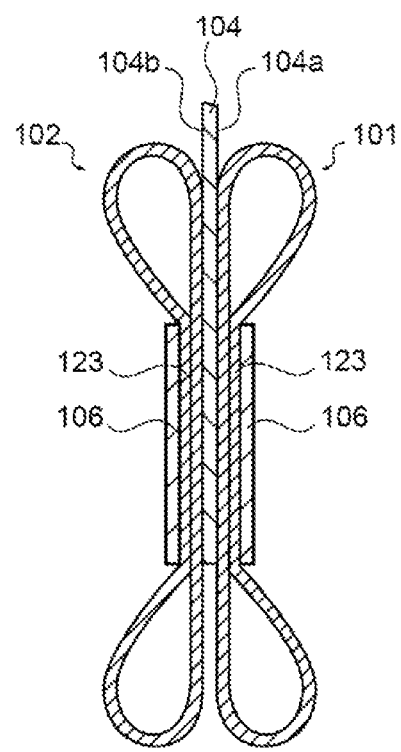
FIG. 19 is a section view of the first electrode body, second electrode body, and negative-electrode terminal provided in the same electrochemical device

FIG. 18 is a section view showing the joining mode of the positive-electrode terminal 103 with the first electrode body 101 and second electrode body 102, or specifically a section view of FIGS. 16 and 17 along line F-F. FIG. 19 is a section view showing the joining mode of the negative-electrode terminal 104 with the first electrode body 101 and second electrode body 102, or specifically a section view of FIGS. 16 and 17 along line G-G.

As shown in FIGS. 16 and 18, the wound positive-electrode non-forming region 122 of the first electrode body 101 is joined to the first principal face 103a, and sandwiched by the first principal face 103a and positive-electrode terminal plate 105. Also, the wound positive-electrode non-forming region 122 of the second electrode body 102 is joined to the second principal face 103b, and sandwiched by the second principal face 103b and positive-electrode terminal plate 105. On both electrode bodies, the respective positive electrode collectors 131 (refer to FIG. 6) constituting the wound positive-electrode non-forming regions 122 are also joined together interlaminarly.

As shown in FIGS. 17 and 19, the wound negative-electrode non-forming region 123 of the first electrode body 101 is joined to the third principal face 104*a*, and sandwiched by the third principal face 104*a* and negative-electrode terminal plate 106. Also, the wound negative-electrode non-forming region 123 of the second electrode body 102 is joined to the fourth principal face 104*b*, and sandwiched by the fourth principal face 104*b* and negative-electrode terminal plate 106. On both electrode bodies, the respective negative electrode collectors 141 (refer to FIG. 6) constituting the wound negative-electrode non-forming regions 123 are also joined together interlaminarly.

The insulation film 107 (refer to FIG. 2) is a film made of synthetic resin or other insulating material. The electrochemical device 100 has two insulation films 107. One insulation film 107 covers the wound positive-electrode non-forming regions 122 of the first electrode body 101 and second electrode body 102, and insulates them from the exterior can 108. The other insulation film 107 covers the wound negative-electrode non-forming regions 123 of the first electrode body 101 and second electrode body 102, and insulates them from the exterior can 108.

The insulation film 107 is made of polyimide resin, for example, and may be 25 mm in width. It should be noted that an insulation layer may be provided on the inner periphery face of the exterior can 108 in place of the insulation film 107.

The exterior can (refer to FIG. 2) houses the first electrode body 101 and second electrode body 102, and forms the housing space together with the lid member 109. The exterior can 108 is made of metal, such as aluminum (A1050-O), for example. The size of the exterior can 108 is 121 mm in length, 13.5 mm in width, and 80 mm in thickness, for example, and the sheet thickness is 0.5 mm, for example.

The lid member 109 (refer to FIG. 2) is installed on the exterior can 108 and supports the positive-electrode terminal 103 and negative-electrode terminal 104. The lid member 109 is made of metal, such as aluminum (A1050-H24), for example. The size of the lid member 109 is 120 mm in length, 12.5 mm in width, and 2 mm in thickness, for example.

The lid member 109 has two openings that are not illustrated, and terminal support members 110 made of PPS (polyphenylene sulfide) or other insulating material are installed in these openings. The positive-electrode terminal 103 and negative-electrode terminal 104 are guided through the terminal support members 110, respectively, and thereby insulated from the lid member 109.

The lid member 109 is joined to the exterior can 108 by means of laser welding or other joining method, to close the housing space. The lid member 109 has a solution filler port 109*a*, and the solution filler port 109*a* is sealed by a solution filler lid 111. The solution filler lid 111 is made of aluminum (A1050-O) or other metal, is shaped like a disk, and has a diameter of 7.6 mm and thickness of 0.4 mm, for example. For the solution filler lid 111, one that has a safety valve function to release the internal pressure of the housing space when it becomes high, is used favorably.

Electrolytic solution is filled in the housing space. The electrolytic solution is a solution containing lithium ions and anions, and may be $LiPF_6$ EC/MEC (mixture of ethylene carbonate (EC) and methyl ethyl carbonate (MEC), in which $LiPF_6$ has been dissolved), for example. The filling quantity of this solution is 80 g, for example.

The electrochemical device 100 has the aforementioned constitution. As described above, the electrochemical device 100 may not be a lithium ion capacitor; instead, it may be any of various other electrochemical devices. In this case, the types of positive-electrode active material, negative-electrode active material and electrolytic solution can be changed according to the type of electrochemical device. Also, the lithium ion supply sources 160 need not be provided.

[Effects of Electrochemical Device]

Figure 20:
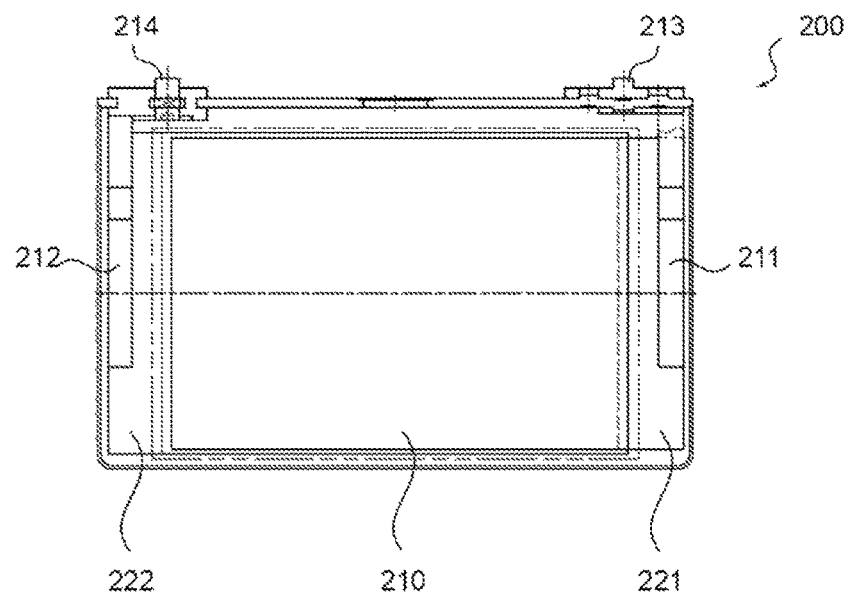
FIG. 20 is a schematic view of an electrochemical device pertaining to a comparative example.
Figure 21:
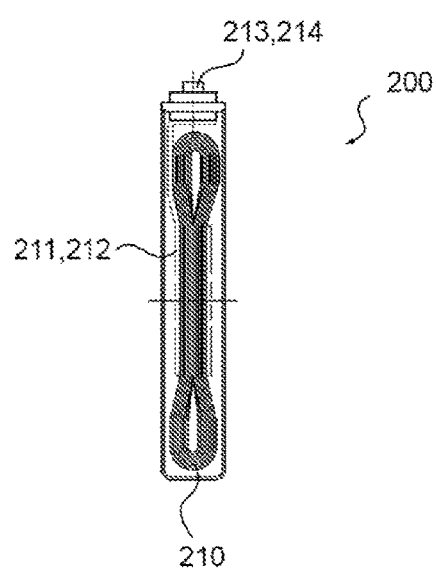
FIG. 21 is a schematic view of an electrochemical device pertaining to a comparative example.

The effects of the electrochemical device 100 are explained based on comparison against comparative examples. FIG. 20 is a front view of the electrochemical device 200 pertaining to the comparative example, while FIG. 21 is a side view of this electrochemical device 200.

Its electrode body 210 has a wound positive-electrode non-forming region 221 constituted by a positive electrode collector foil that has been wound, as well as a wound negative-electrode non-forming region 222 constituted by a negative electrode collector foil that has been wound. The wound positive-electrode non-forming region 221 is joined to an internal positive-electrode terminal 211, while the wound negative-electrode non-forming region 222 is joined to an internal negative-electrode terminal 212.

The internal positive-electrode terminal 211 bends in the thickness direction of the electrode body 210, and connects to an external positive-electrode terminal 213. The internal negative-electrode terminal 212 also bends in the thickness direction of the electrode body 210, and connects to an external negative-electrode terminal 214.

Based on this structure, where the external terminals and internal terminals of the positive electrode and negative electrode are separate structures, the number of parts constituting the electrochemical device 200 increases and this can add to cost.

Figure 22:
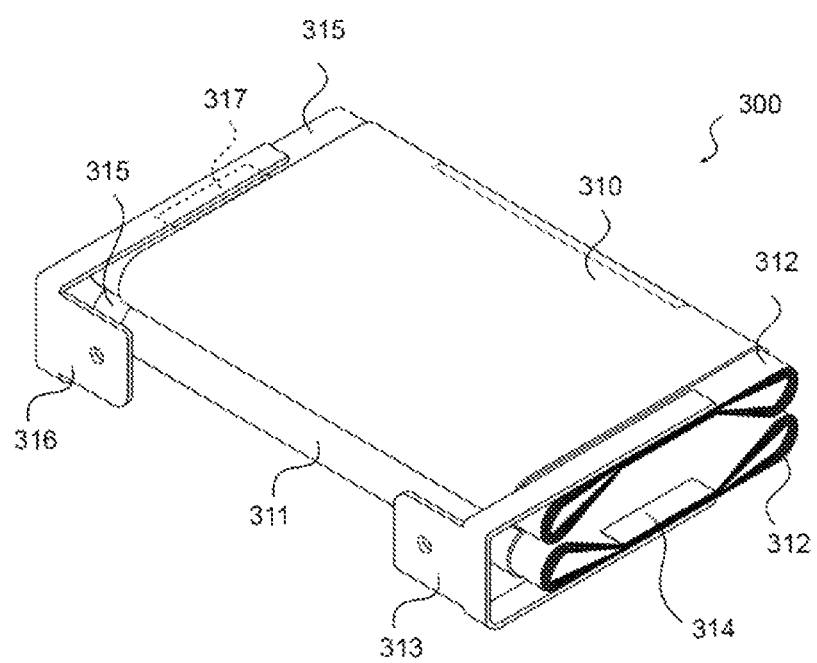
FIG. 22 is a schematic view of an electrochemical device pertaining to a comparative example.

Electrochemical devices having two electrode bodies are also utilized to increase the capacitance provided by the electrochemical device. FIG. 22 is a perspective view of a partial structure of the electrochemical device 300 pertaining to a different comparative example.

As shown in this figure, the wound positive-electrode non-forming regions 312 of the first electrode body 310 and second electrode body 311 are respectively joined to internal positive-electrode terminals 313 that are shaped in such a way that they are apart from each other in the thickness direction of the first electrode body 310 and second electrode body 311, and sandwiched by the internal positive-electrode terminals 313 and positive-electrode terminal plates 314.

Also, the wound negative-electrode non-forming regions 315 of the first electrode body 310 and second electrode body 311 are respectively joined to internal negative-electrode terminals 316 that are shaped in such a way that they are apart from each other in the thickness direction of the first electrode body 310 and second electrode body 311, and sandwiched by the internal negative-electrode terminals 316 and negative-electrode terminal plates 317.

Based on this structure, where the wound positive-electrode non-forming regions 312 of both electrode bodies must be joined to the internal positive-electrode terminals 313, respectively, the wound negative-electrode non-forming regions 315 of both electrode bodies must be joined to the internal negative-electrode terminals 316, respectively. This requires many joining steps and results in poor productivity. Also, the shapes of the internal positive-electrode terminal 313 and internal negative-electrode terminal 316 become complex, thus making the costs of these parts higher.

On the other hand, the electrochemical device 100 pertaining to this embodiment allows for the number of parts to be reduced because the positive-electrode terminal 103 and negative-electrode terminal 104 serve as an internal terminal provided inside the exterior can 108, and an external terminal provided outside the exterior can 108.

Also, the positive-electrode terminal 103 and negative-electrode terminal 104 are shaped like a flat sheet, so these parts cost less. Furthermore, the wound positive-electrode non-forming regions 122 of the first electrode body 101 and second electrode body 102 can be joined to the positive-electrode terminal 103 all at once, while the wound negative-electrode non-forming regions 123 of the first electrode body 101 and second electrode body 102 can be joined to the negative-electrode terminal 104 all at once, and consequently the joining steps can be reduced.

In other words, the electrochemical device 100 has a structure that can be produced at low cost, while ensuring large capacitance.

[Manufacturing Method]

The method of manufacturing the electrochemical device 100 is explained.

An electrode body 120 can be manufactured by stacking and winding a positive electrode 130, negative electrode 140, and separators 150 together, and then attaching lithium ion supply sources 160 on both the top and bottom faces of this flat-wound structure, as described above.

Two electrode bodies 120 are joined to a positive-electrode terminal 103 and negative-electrode terminal 104, as a first electrode body 101 and a second electrode body 102, respectively (refer to FIG. 3).

Figure 23:
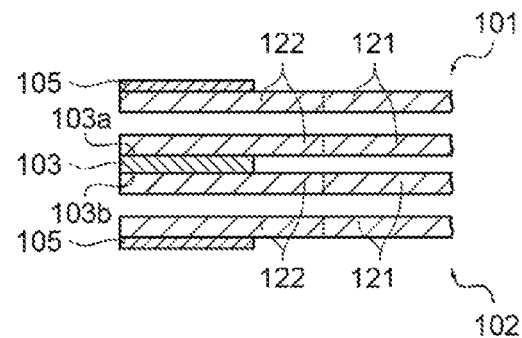
FIG. 23 is a schematic view showing a method of manufacturing an electrochemical device pertaining to the first embodiment of the present invention.
Figure 24:
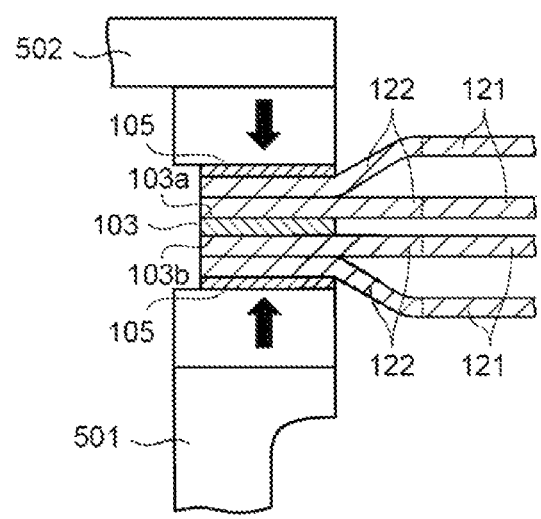
FIG. 24 is a schematic view showing the same method of manufacturing an electrochemical device.

FIGS. 23 and 24 are schematic views showing how to join the first electrode body 101 and second electrode body 102 with the positive-electrode terminal 103. As shown in FIG. 23, the positive-electrode terminal 103 is inserted between the wound positive-electrode non-forming regions 122 of the first electrode body 101 and second electrode body 102. Also, positive-electrode terminal plates 105 are placed on the wound positive-electrode non-forming regions 122 of the first electrode body 101 and second electrode body 102. In this condition, the two positive-electrode terminal plates 105 are gripped by a clamp, etc., and secured.

Next, the two positive-electrode terminal plates 105 are gripped using an ultrasonic welding anvil 501 and an ultrasonic welding horn 502, as shown in FIG. 24 (arrows in the figure). The thickness of this part is a total of 2.74 mm, for example, based on one positive-electrode terminal 103 of 1.5 mm in thickness, 21 positive electrode collector 131 layers of 0.02 mm in thickness each, and two positive-electrode terminal plates 105 of 0.2 mm in thickness each.

When ultrasonic waves are applied in this condition, the wound positive-electrode non-forming region 122 of the first electrode body 101 is joined to the first principal face 103a, while the wound positive-electrode non-forming region 122 of the second electrode body 102 is joined to the second principal face 103b. Also, the positive electrode collectors 131 constituting the positive-electrode non-forming regions 122 of both electrode bodies are joined together.

As described above, the wound positive-electrode non-forming regions 122 of the first electrode body 101 and second electrode body 102 can be joined to the positive-electrode terminal 103 in a single joining step. The positive-electrode terminal plates 105 protect the positive electrode collectors 131 from damage caused by the ultrasonic waves.

Figure 25:
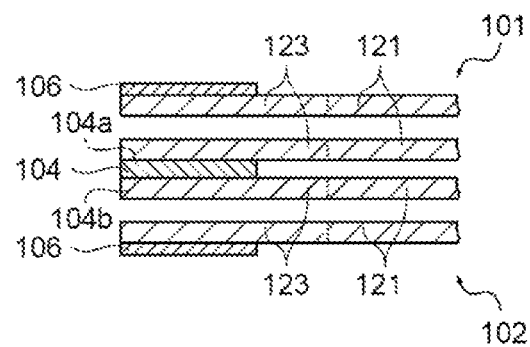
FIG. 25 is a schematic view showing the same method of manufacturing an electrochemical device.
Figure 26:
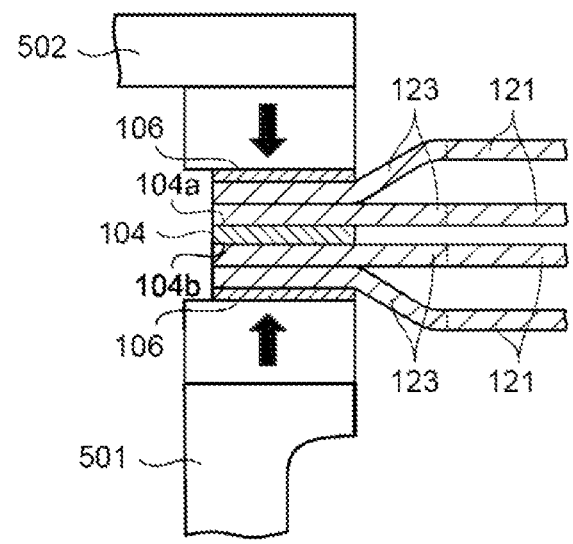
FIG. 26 is a schematic view showing the same method of manufacturing an electrochemical device.

FIGS. 25 and 26 are schematic views showing how to join the first electrode body 101 and second electrode body 102 with the negative-electrode terminal 104. As shown in FIG. 25, the negative-electrode terminal 104 is inserted between the wound negative-electrode non-forming regions 123 of the first electrode body 101 and second electrode body 102. Also, negative-electrode terminal plates 106 are placed on the wound negative-electrode non-forming regions 123 of the first electrode body 101 and second electrode body 102. In this condition, the two negative-electrode terminal plates 105 are gripped by a clamp, etc., and secured.

Next, the two negative-electrode terminal plates 106 are gripped using an ultrasonic welding anvil 501 and an ultrasonic welding horn 502, as shown in FIG. 26 (arrows in the figure). The thickness of this part is a total of 2.10 mm, for example, based on one negative-electrode terminal 104 of 1.2 mm in thickness, 23 negative electrode collector 141 layers of 0.01 mm in thickness each, and two negative-electrode terminal plates 106 of 0.2 mm in thickness each.

When ultrasonic waves are applied in this condition, the wound negative-electrode non-forming region 123 of the first electrode body 101 is joined to the third principal face 104a, while the wound negative-electrode non-forming region 123 of the second electrode body 102 is joined to the fourth principal face 104b. Also, the negative electrode collectors 141 constituting the negative-electrode non-forming regions 123 of both electrode bodies are joined together.

As described above, the wound negative-electrode non-forming regions 123 of the first electrode body 101 and second electrode body 102 can be joined to the negative-electrode terminal 104 in a single joining step. The negative-electrode terminal plates 106 protect the negative electrode collectors 141 from damage caused by the ultrasonic waves.

Next, the wound positive-electrode non-forming regions 122 and wound negative-electrode non-forming regions 123 of the first electrode body 101 and second electrode body 102 are covered with insulation films 107 (refer to FIG. 2) and then loaded into the exterior can 108, after which the exterior can 108 and lid member 109 are joined together. The joining of the exterior can 108 and lid member 109 may be performed by means of laser welding, for example.

Next, electrolytic solution is filled from the solution filler port 109a, after which the solution filler lid 111 is joined to the lid member 109 to seal the solution filler port 109a. The joining of the lid member 109 and solution filler lid 111 may be performed by means of laser welding, for example.

The electrochemical device 100 can be manufactured as described above. The wound positive-electrode non-forming regions 122 of the first electrode body 101 and second electrode body 102 can be joined to the positive-electrode terminal 103 by single welding, while the wound negative-electrode non-forming regions 123 of both electrode bodies can also be joined to the negative-electrode terminal 104 by single welding, as described above. This way, the manufacturing steps can be simplified and the electrochemical device 100 can be manufactured at low cost. It should be noted that the aforementioned manufacturing method is only an example, and the electrochemical device 100 may be manufactured by other manufacturing methods.

(Second Embodiment)

The second embodiment of the present invention is explained.

[Structure of Electrochemical Device]

Figure 27:
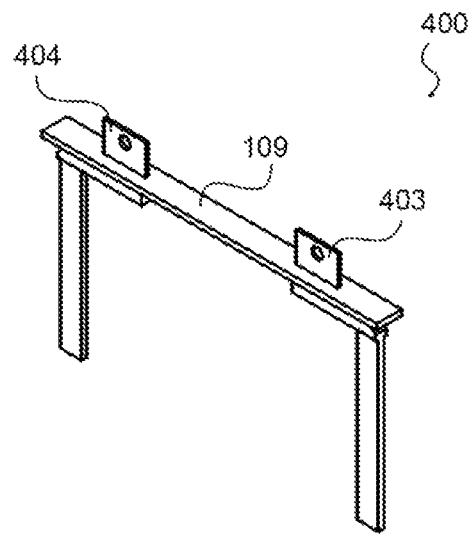
FIG. 27 is a perspective view showing a part of the constitution of an electrochemical device pertaining to the second embodiment of the present invention.

FIG. 27 is a perspective view of a part of the constitution of an electrochemical device 400 pertaining to the second embodiment. The electrochemical device 400 differs from the electrochemical device 100 pertaining to the first embodiment in terms of how the positive-electrode terminal and the negative-electrode terminal are constituted, but the rest of the constitution is the same as with the electrochemical device 100. Accordingly, the rest of the constitution, except for the positive-electrode terminal and the negative-electrode terminal, is denoted by the same symbols used in the first embodiment and not explained.

A positive-electrode terminal 403 and a negative-electrode terminal 404 are installed on the lid member 109 just like in the first embodiment.

Figure 28:
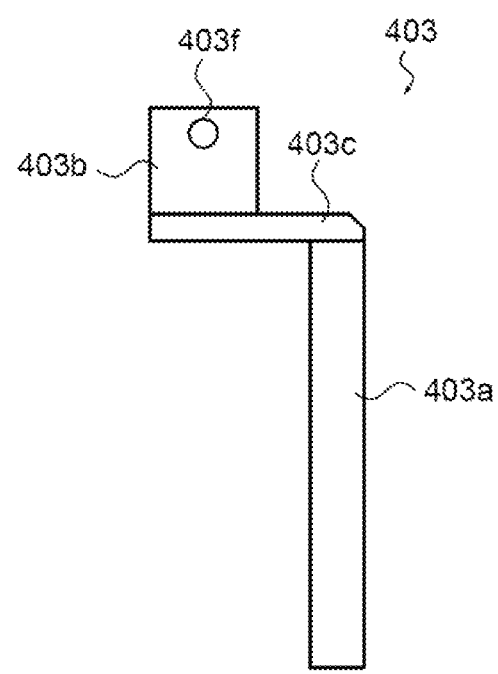
FIG. 28 is a plan view of the positive-electrode terminal provided in the same electrochemical device.
Figure 29:
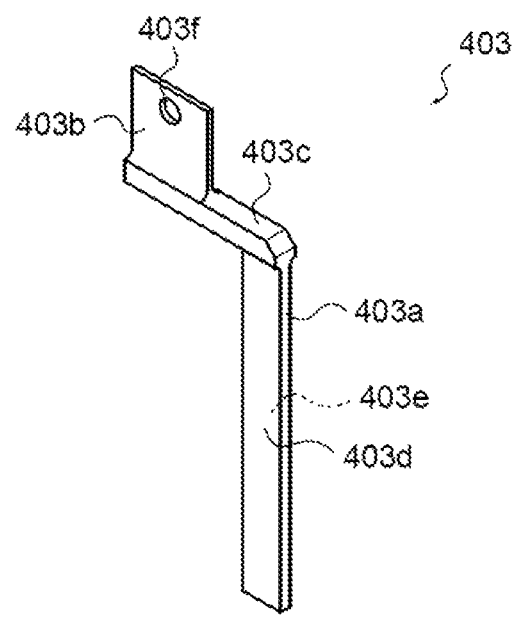
FIG. 29 is a perspective view of the positive-electrode terminal provided in the same electrochemical device.
Figure 30:
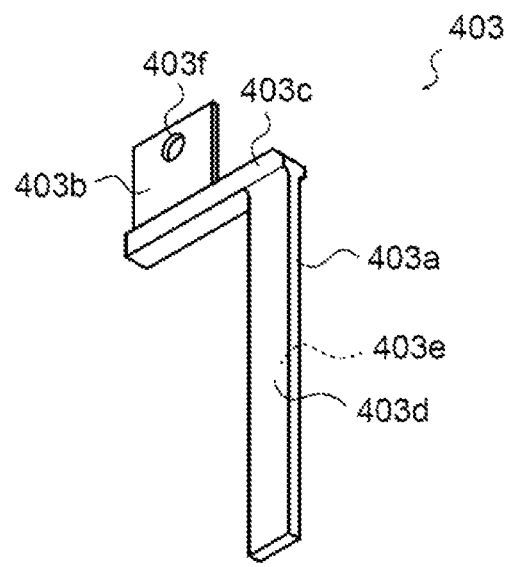
FIG. 30 is a perspective view of the positive-electrode terminal provided in the same electrochemical device.

FIG. 28 is a plan view of the positive-electrode terminal 403, while FIGS. 29 and 30 are perspective views of the positive-electrode terminal 403. The positive-electrode terminal 403 is a plate-shaped member made of metal. The positive-electrode terminal 403 may be made of aluminum (A1050-H24), for example. The positive-electrode terminal 403 is inserted into the lid member 109 and insulated from the lid member 109 by the terminal support member 110 made of synthetic resin, etc.

As shown in FIGS. 28 through 30, the positive-electrode terminal 403 is constituted by an electrode body joint part 403*a*, external terminal part 403*b*, and relay part 403*c*.

The electrode body joint part 403*a* is where the first electrode body 101 and second electrode body 102 are joined. As shown in FIGS. 29 and 30, one principal face of the electrode body joint 403*a* is referred to as "first principal face 403*d*," while the principal face on the opposite side is referred to as "second principal face 403*e*."

The wound positive-electrode non-forming region 122 of the first electrode body 101 is joined to the first principal face 403*d*, and the wound positive-electrode non-forming region 122 is sandwiched between the first principal face 403*d* and positive-electrode terminal plate 105 (refer to FIG. 18). The wound positive-electrode non-forming region 122 of the second electrode body 102 is joined to the second principal face 403*e*, and the wound positive-electrode non-forming region 122 is sandwiched between the second principal face 403*e* and positive-electrode terminal plate 105 (refer to FIG. 18).

The external terminal part 403*b* projects outward from a housing space housing the first electrode body 101, second electrode body 102, and electrolytic solution, and as this is where an external device is connected, a through hole 403*f* used for connection with an external device, etc., is provided.

The relay part 403*c* extends in the direction crossing at right angles with the extending direction of the electrode body joint part 403*a* and external terminal part 403*b*, and connects the electrode body joint part 403*a* and external terminal part 403*b* both physically and electrically.

Figure 31:
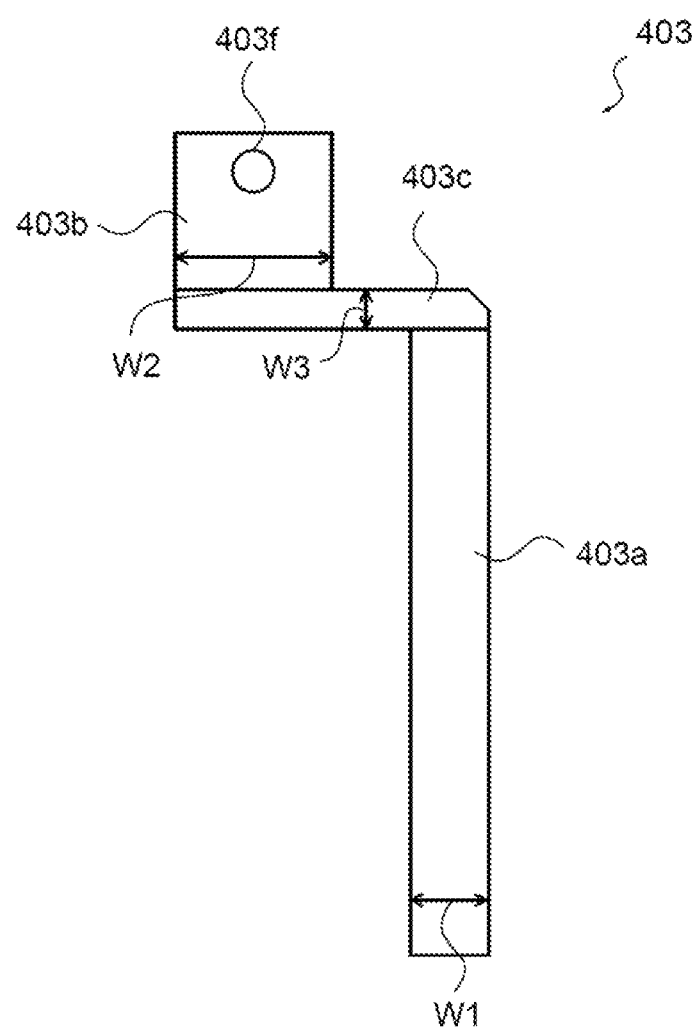
FIG. 31 is a schematic view showing the width of each part of the positive-electrode terminal provided in the same electrochemical device.
Figure 32:
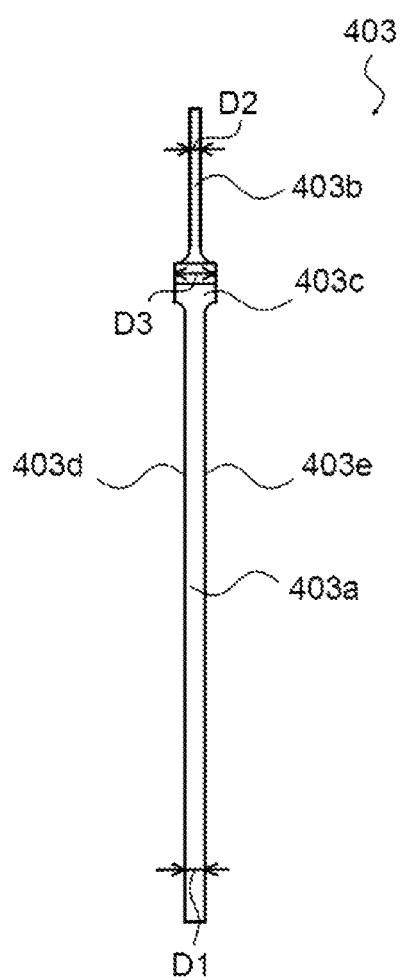
FIG. 32 is a schematic view showing the thickness of each part of the positive-electrode terminal provided in the same electrochemical device.

FIG. 31 is a schematic view showing the width of each part of the positive-electrode terminal 403, while FIG. 32 is a schematic view showing the thickness of each part of the positive-electrode terminal 403.

As shown in FIG. 31, the width of the electrode body joint part 403*a* is designated as a first width W1, the width of the external terminal part 403*b* is designated as a second width W2, and the width of the relay part 403*c* is designated as a third width W3. Here, the first width W1 is greater than the third width W3, and the second width W2 is greater than the first width W1. In other words, the third width W3, first width W1 and second width W2 are respectively greater than the one before.

Also, as shown in FIG. 32, the thickness of the electrode body joint part 403*a* is designated as a first thickness D1, the thickness of the external terminal part 403*b* is designated as a second thickness D2, and the thickness of the relay part 403*c* is designated as a third thickness D3. Here, the first thickness D1 is greater than the second thickness D2, and the third thickness D3 is greater than the first thickness D1. In other words, the second thickness D2, first thickness D1 and third thickness D3 are respectively greater than the one before.

Furthermore, preferably the cross-section area (D1×W1) of the electrode body joint part 403*a*, cross-section area (D2×W2) of the external terminal part 403*b*, and cross-section area (D3×W3) of the relay part 403*c*, are all the same.

By constituting the positive-electrode terminal 403 as described above, the shape of each part can be adjusted as required. To be specific, the width (second width W2) of the external terminal part 403*b* can be increased to enlarge the diameter of a bolt that can be inserted into the through hole 403*f*, and also to improve the strength of the terminal support member 110.

In addition, the width (third width W3) of the relay part 403*c* can be decreased to increase the volume (i.e., storage capacity) of the electrode body. Furthermore, the width (first width W1) of the electrode body joint part 403*a* can be adjusted to the minimum width required for ultrasonic welding of the electrode body.

In addition, by establishing the aforementioned relationship among the thicknesses of the respective parts, the differences among the cross-section areas of the respective parts can be reduced and the differences among the electrical resistances at the respective parts can also be reduced. In particular, adjusting the respective parts to have the same cross-section area is preferable as the electrical resistances at the respective parts can be made uniform.

Figure 33:
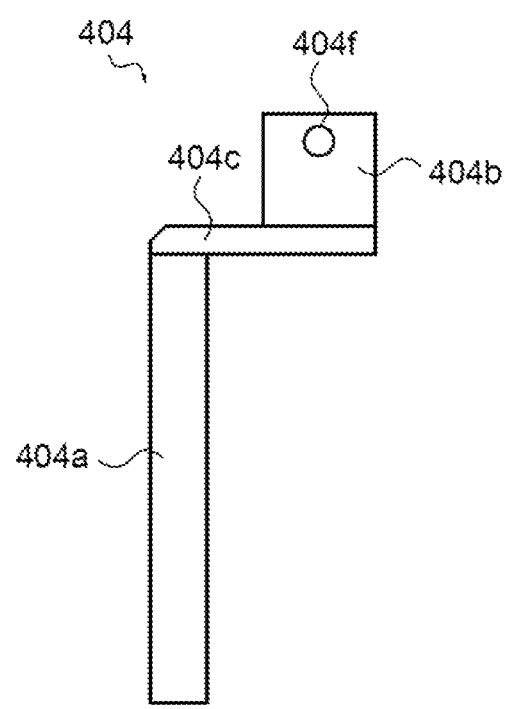
FIG. 33 is a plan view of the negative-electrode terminal provided in the same electrochemical device.
Figure 34:
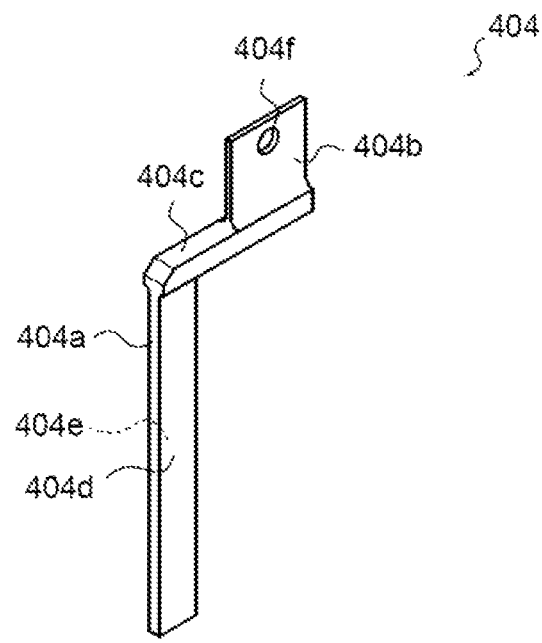
FIG. 34 is a perspective view of the negative-electrode terminal provided in the same electrochemical device.
Figure 35:
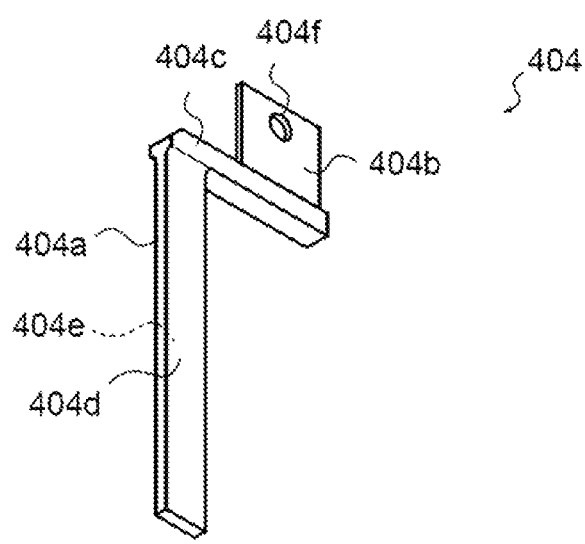
FIG. 35 is a perspective view of the negative-electrode terminal provided in the same electrochemical device.

FIG. 33 is a plan view of the negative-electrode terminal 404, while FIGS. 34 and 35 are perspective views of the negative-electrode terminal 404. The negative-electrode terminal 404 is a plate-shaped member made of metal. The negative-electrode terminal 404 may be made of copper (C1100-1/4H), for example. The negative-electrode terminal 404 is inserted into the lid member 109 and insulated from the lid member 109 by the terminal support member 110 made of synthetic resin, etc.

As shown in FIGS. 33 through 35, the negative-electrode terminal 404 is constituted by an electrode body joint part 404*a*, external terminal part 404*b* and relay part 404*c*.

The electrode body joint part 404*a* is where the first electrode body 101 and second electrode body 102 are joined. As shown in FIGS. 34 and 35, one principal face of the electrode body joint part 404*a* is referred to as "first principal face 404*d*," while the principal face on the opposite side is referred to as "second principal face 404*e*."

The wound negative-electrode non-forming region 123 of the first electrode body 101 is joined to the first principal face 404*d*, and the wound positive negative-electrode non-forming region 123 is sandwiched between the first principal face 404*d* and negative-electrode terminal plate 106 (refer to FIG. 19). The wound negative-electrode non-forming region 123 of the second electrode body 102 is joined to the second principal face 404*e*, and the wound negative-electrode non-forming region 123 is sandwiched between the second principal face 404*e* and negative-electrode terminal plate 106 (refer to FIG. 19).

The external terminal part 404*b* projects outward from the housing space housing the first electrode body 101, second electrode body 102, and electrolytic solution, and as this is where an external device is connected, a through hole 404*f* used for connection with an external device, etc., is provided.

The relay part 404c extends in the direction crossing at right angles with the extending direction of the electrode body joint part 404a and external terminal part 404b, and connects the electrode body joint part 404a and external terminal part 404b both physically and electrically.

Figure 36:
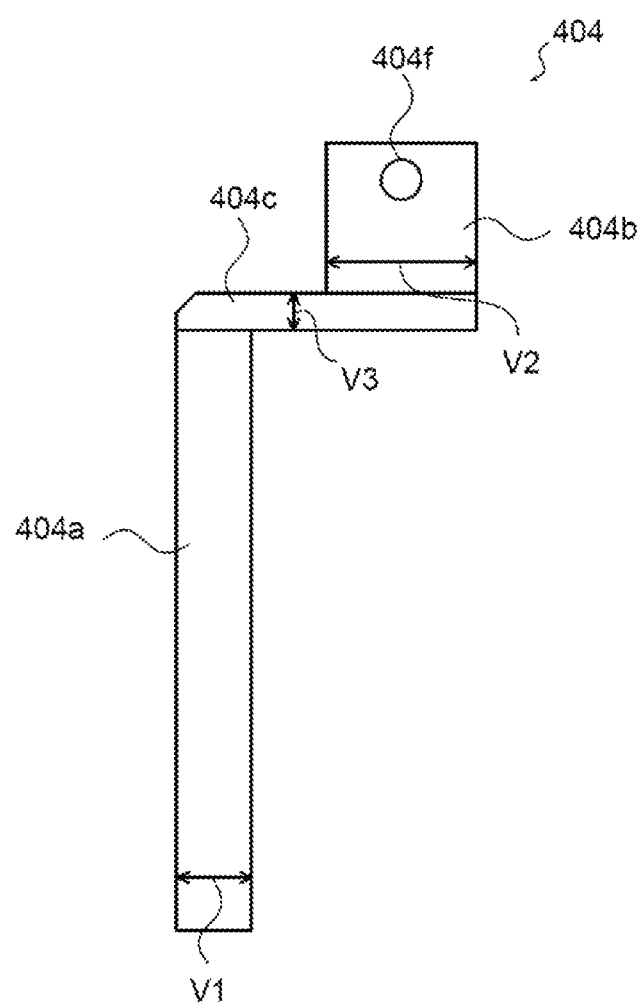
FIG. 36 is a schematic view showing the width of each part of the negative-electrode terminal provided in the same electrochemical device.
Figure 37:
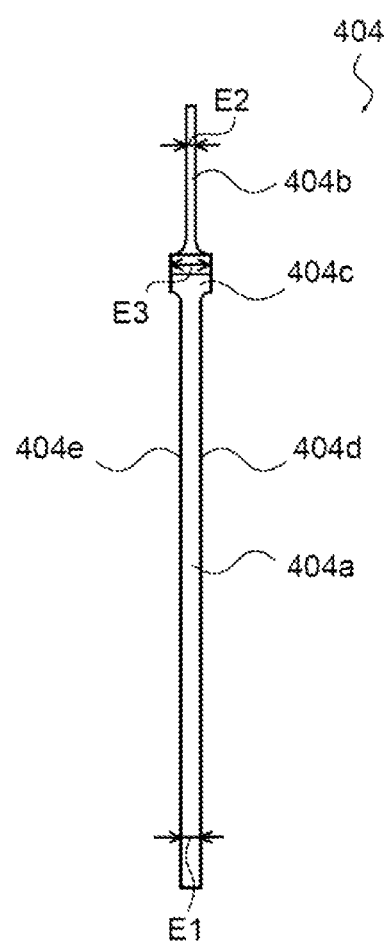
FIG. 37 is a schematic view showing the thickness of each part of the negative-electrode terminal provided in the same electrochemical device.

FIG. 36 is a schematic view showing the width of each part of the negative-electrode terminal 404, while FIG. 37 is a schematic view showing the thickness of each part of the negative-electrode terminal 404.

As shown in FIG. 36, the width of the electrode body joint part 404a is designated as a first width V1, the width of the external terminal part 404b is designated as a second width V2, and the width of the relay part 404c is designated as a third width V3. Here, the first width V1 is greater than the third width V3, and the second width V2 is greater than the first width V1. In other words, the third width V3, first width V1 and second width V2 are respectively greater than the one before.

Also, as shown in FIG. 37, the thickness of the electrode body joint part 404a is designated as a first thickness E1, the thickness of the external terminal part 404b is designated as a second thickness E2, and the thickness of the relay part 404c is designated as a third thickness E3. Here, the first thickness E1 is greater than the second thickness E2, and the third thickness E3 is greater than the first thickness E1. In other words, the second thickness E2, first thickness E1, and third thickness E3 are respectively greater than the one before.

Furthermore, preferably the cross-section area (E1×V1) of the electrode body joint part 404a, cross-section area (E2×V2) of the external terminal part 404b, and cross-section area (E3×V3) of the relay part 404c, are all the same.

By constituting the negative-electrode terminal 404 as described above, the shape of each part can be adjusted as required. To be specific, the width (second width V2) of the external terminal part 404b can be increased to enlarge the diameter of a bolt that can be inserted into the through hole 404f, and also to improve the strength of the terminal support member 110.

In addition, the width (third width V3) of the relay part 404c can be decreased to increase the volume (i.e., storage capacity) of the electrode body. Furthermore, the width (first width V1) of the electrode body joint part 404a can be adjusted to the minimum width required for ultrasonic welding of the electrode body.

In addition, by establishing the aforementioned relationship among the thicknesses of the respective parts, the differences among the cross-section areas of the respective parts can be reduced and the differences among the electrical resistances at the respective parts can also be reduced. In particular, adjusting the respective parts to have the same cross-section area is preferable as the electrical resistances at the respective parts can be made uniform.

The positive-electrode terminal 403 and negative-electrode terminal 404 are constituted as described above. It should be noted, however, that the electrochemical device 400 need not have both the positive-electrode terminal 403 and negative-electrode terminal 404; instead, it can have at least one of the positive-electrode terminal 403 and negative-electrode terminal 404.

[Method of Manufacturing Positive-Electrode Terminal and Negative-Electrode Terminal]

Figure 38:
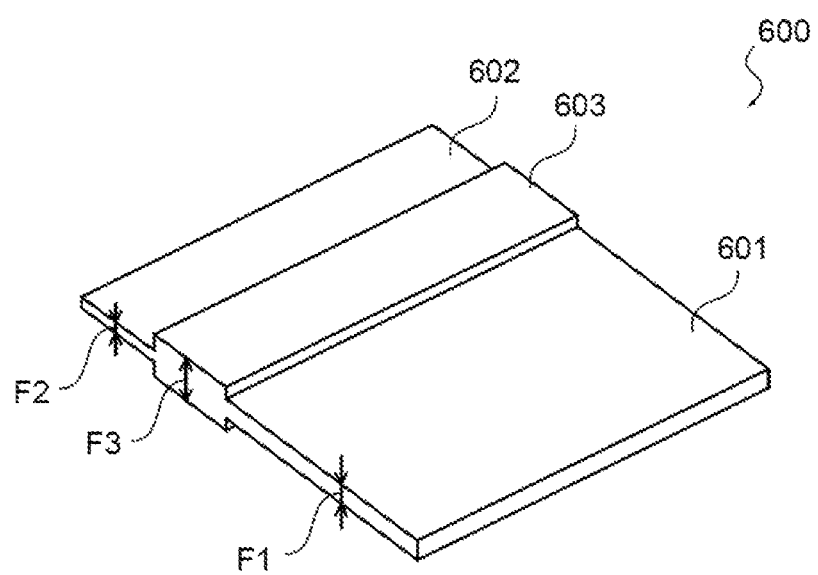
FIG. 38 is a schematic view of a rolled irregular-shaped bar which will be used as the material for the positive-electrode terminal and negative-electrode terminal provided in the same electrochemical device.

The positive-electrode terminal 403 and negative-electrode terminal 404 can be produced by processing a rolled irregular-shaped bar. FIG. 38 is a perspective view of such rolled irregular-shaped bar 600.

An irregular-shaped bar is a metal bar whose cross-section shape has steps (convexes and concaves), and such irregular-shaped bar is made into a rolled irregular-shaped bar by means of rolling. Its features include less material loss, lower surface roughness, less waviness, less lateral bending, and no hardened layer due to cutting, compared to cutting.

As shown in FIG. 38, the rolled irregular-shaped bar 600 has a first part 601 with a first thickness F1, a second part 602 with a second thickness F2, and a third part 603 with a third thickness F3. The first thickness F1 is greater than the second thickness F2, and the third thickness F3 is greater than the first thickness F1.

Figure 39:
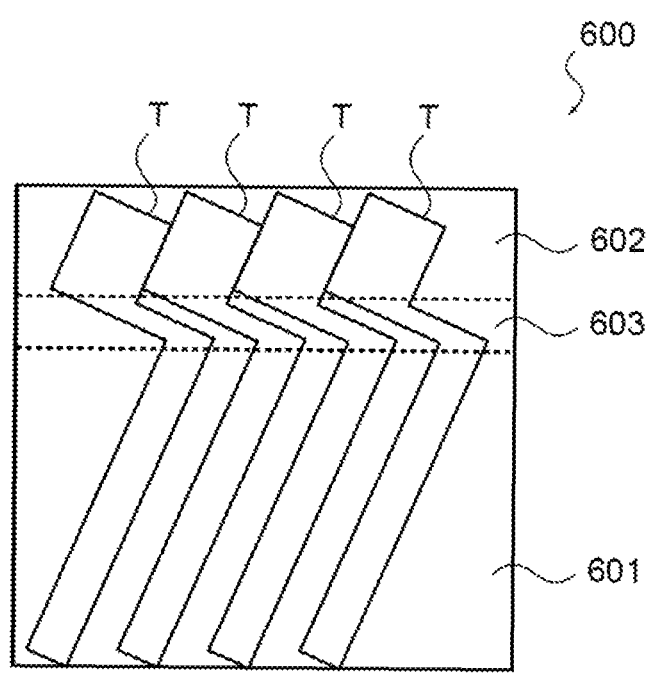
FIG. 39 is a schematic view showing a method of manufacturing the positive-electrode terminal and negative-electrode terminal provided in the same electrochemical device.

The positive-electrode terminal 403 and negative-electrode terminal 404 can be produced by cutting the rolled irregular-shaped bar 600. FIG. 39 is a schematic view showing how the rolled irregular-shaped bar 600 is cut. As shown in this figure, the rolled irregular-shaped bar 600 can be stamped or otherwise cut into the shapes of the positive-electrode terminal 403 and negative-electrode terminal 404 as indicated by the lines T, to produce the positive-electrode terminal 403 and negative-electrode terminal 404 having the aforementioned shapes.

It should be noted that the method for producing the positive-electrode terminal 403 and negative-electrode terminal 404 is not limited to cutting the rolled irregular-shaped bar 600, and it is also possible to produce them by cutting a sheet of certain thickness into individual plates and then pressing and trimming the individual sheets.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2016-041766, filed Mar. 4, 2016, and No. 2016-241923, filed Dec. 14, 2016, each disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. An electrochemical device, comprising:
a positive-electrode terminal which is planarly shaped, and has a first principal face and a second principal face on an opposite side of the first principal face;

a negative-electrode terminal which is planarly shaped, and has a third principal face and a fourth principal face on an opposite side of the third principal face;

a first electrode body comprising:
- a first positive electrode which has a first positive electrode collector being a metal foil, as well as a first positive-electrode active material layer formed on the first positive electrode collector, and on which a first positive-electrode forming region where the first positive-electrode active material layer is formed on the first positive electrode collector, and a first positive-electrode non-forming region where the first positive-electrode active material layer is not formed on the first positive electrode collector, are formed;
- a first negative electrode which has a first negative electrode collector being a metal foil, as well as a first negative-electrode active material layer formed on the first negative electrode collector, and on which a first negative-electrode forming region where the first negative-electrode active material layer is formed on the first negative electrode collector, and a first negative-electrode non-forming region where the first negative-electrode active material layer is not formed on the first negative electrode collector, are formed; and
- a first separator which separates the first positive electrode and first negative electrode;

wherein the first electrode body is such that the first positive electrode, the first negative electrode, and the first separator are stacked and wound together into a flat-wound structure forming a first wound body shaped like a flat sheet having a front face and a rear face, and the first electrode body has a first wound positive-electrode non-forming region, at one end in a direction of a winding axis, constituted by the first positive-electrode non-forming region that has been wound, as well as a first wound negative-electrode non-forming region, at another end in the winding axis direction, constituted by the first negative-electrode non-forming region that has been wound, wherein the first electrode body further has two sheet-shaped lithium ion supply sources that adjoin the front face and the rear face of the first wound body, respectively, in a manner sandwiching the first wound body;

a second electrode body comprising:
- a second positive electrode which has a second positive electrode collector being a metal foil, as well as a second positive-electrode active material layer formed on the second positive electrode collector, and on which a second positive-electrode forming region where the second positive-electrode active material layer is formed on the second positive electrode collector, and a second positive-electrode non-forming region where the second positive-electrode active material layer is not formed on the second positive electrode collector, are formed;
- a second negative electrode which has a second negative electrode collector being a metal foil, as well as a second negative-electrode active material layer formed on the second negative electrode collector, and on which a second negative-electrode forming region where the second negative-electrode active material layer is formed on the second negative electrode collector, and a second negative-electrode non-forming region where the second negative-electrode active material layer is not formed on the second negative electrode collector, are formed; and
- a second separator which separates the second positive electrode and second negative electrode;

wherein the second electrode body is such that the second positive electrode, the second negative electrode, and the second separator are stacked and wound together into a flat-wound structure forming a second wound body shaped like a flat sheet having a front face and a rear face, and the second electrode body has a second wound positive-electrode non-forming region, at one end in a direction of a winding axis, constituted by the second positive-electrode non-forming region that has been wound, as well as a second wound negative-electrode non-forming region, at another end in the winding axis direction, constituted by the second negative-electrode non-forming region that has been wound, wherein the second electrode body further has two sheet-shaped lithium ion supply sources that adjoin the front face and the rear face of the second wound body, respectively, in a manner sandwiching the second wound body; and electrolytic solution which immerses the first electrode body and second electrode body;

wherein the first wound positive-electrode non-forming region is joined to the first principal face, the first wound negative-electrode non-forming region is joined to the third principal face, the second wound positive-electrode non-forming region is joined to the second principal face, and the second wound negative-electrode non-forming region is joined to the fourth principal face.

2. An electrochemical device according to claim 1, wherein:

the positive-electrode terminal has: an electrode body joint part to which the first wound positive-electrode non-forming region and second wound positive-electrode non-forming region are joined and which has a first width and a first thickness; an external terminal part which projects outward from a housing space housing the first electrode body, second electrode body, and electrolytic solution and which has a second width and a second thickness; and a relay part which connects the electrode body joint part and external terminal part and which has a third width and a third thickness; wherein, the first width is greater than the third width;
the second width is greater than the first width;
the first thickness is greater than the second thickness; and
the third thickness is greater than the first thickness.

3. An electrochemical device according to claim 1, wherein:

the negative-electrode terminal has: an electrode body joint part to which the first wound negative-electrode non-forming region and second wound negative-electrode non-forming region are joined and which has a first width and a first thickness; an external terminal part which projects outward from a housing space housing the first electrode body, second electrode body, and electrolytic solution and which has a second width and a second thickness; and a relay part which connects the electrode body joint part and external terminal part and which has a third width and a third thickness; wherein, the first width is greater than the third width;
the second width is greater than the first width;

the first thickness is greater than the second thickness; and
the third thickness is greater than the first thickness.

4. An electrochemical device according to claim 1, wherein:
the positive-electrode terminal has: an electrode body joint part to which the first wound positive-electrode non-forming region and second wound positive-electrode non-forming region are joined and which has a first width and a first thickness; an external terminal part which projects outward from a housing space housing the first electrode body, second electrode body, and electrolytic solution and which has a second width and a second thickness; and a relay part which connects the electrode body joint part and external terminal part and which has a third width and a third thickness; wherein,
the first width is greater than the third width;
the second width is greater than the first width;
the first thickness is greater than the second thickness; and
the third thickness is greater than the first thickness; and
the negative-electrode terminal has: an electrode body joint part to which the first wound negative-electrode non-forming region and second wound negative-electrode non-forming region are joined and which has a fourth width and a fourth thickness; an external terminal part which projects outward from the housing space housing the first electrode body, second electrode body, and electrolytic solution and which has a fifth width and a fifth thickness; and a relay part which connects the electrode body joint part and external terminal part and which has a sixth width and a sixth thickness; wherein,
the fourth width is greater than the sixth width;
the fifth width is greater than the fourth width;
the fourth thickness is greater than the fifth thickness; and
the sixth thickness is greater than the fourth thickness.

5. An electrochemical device according to claim 3, wherein, in the positive-electrode terminal, the electrode body joint part, external terminal part, and relay part all have a same cross-section area.

6. An electrochemical device according to claim 4, wherein, in the negative-electrode terminal, the electrode body joint part, external terminal part, and relay part all have a same cross-section area.

7. An electrochemical device according to claim 1, wherein:
solely a center portion of the first wound positive-electrode non-forming region along the one end of the first electrode body is sandwiched by and joined to the first principal face of the positive-electrode terminal and a first positive-electrode terminal plate placed on the center portion, and a center portion of the second wound positive-electrode non-forming region along the one end of the second electrode body is sandwiched by and joined to the second principal face of the positive-electrode terminal and a second positive-electrode terminal plate placed on the center portion, and
solely a center portion of the first wound negative-electrode non-forming region along the another end of the first electrode body is sandwiched by and joined to the third principal face of the negative-electrode terminal and a first negative-electrode terminal plate placed on the center portion, and a center portion of the second wound negative-electrode non-forming region along the another end of the second electrode body is sandwiched by and joined to the fourth principal face of the negative-electrode terminal and a second negative-electrode terminal plate placed on the center portion.

8. An electrochemical device according to claim 7, wherein:
the first positive-electrode terminal plate, the center portion of the first wound positive-electrode non-forming region, the first principal face of the positive-electrode terminal, the second principal face of the positive-electrode terminal, the center portion of the second wound positive-electrode non-forming region, and the second positive-electrode terminal plate are welded, and
the first negative-electrode terminal plate, the center portion of the first wound negative-electrode non-forming region, the third principal face of the negative-electrode terminal, the fourth principal face of the negative-electrode terminal, the center portion of the second wound negative-electrode non-forming region, and the second negative-electrode terminal plate are welded.

9. A method of manufacturing electrochemical device, comprising:
preparing:
a positive-electrode terminal which is planarly shaped, and has a first principal face and a second principal face on an opposite side of the first principal face;
a negative-electrode terminal which is planarly shaped, and has a third principal face and a fourth principal face on an opposite side of the third principal face;
a first electrode body comprising:
a first positive electrode which has a first positive electrode collector being a metal foil, as well as a first positive-electrode active material layer formed on the first positive electrode collector, and on which a first positive-electrode forming region where the first positive-electrode active material layer is formed on the first positive electrode collector, and a first positive-electrode non-forming region where the first positive-electrode active material layer is not formed on the first positive electrode collector, are formed;
a first negative electrode which has a first negative electrode collector being a metal foil, as well as a first negative-electrode active material layer formed on the first negative electrode collector, and on which a first negative-electrode forming region where the first negative-electrode active material layer is formed on the first negative electrode collector, and a first negative-electrode non- forming region where the first negative-electrode active material layer is not formed on the first negative electrode collector, are formed; and
a first separator which separates the first positive electrode and first negative electrode;
wherein the first electrode body is such that the first positive electrode, the first negative electrode, and the first separator are stacked and wound together into a flat-wound structure forming a first wound body shaped like a flat sheet having a front face and a rear face, and the first electrode body has a first wound positive-electrode non-forming region, at one end in a direction of a winding axis, constituted by the first positive-electrode non-forming region that has been wound, as well as a first wound negative-electrode non-forming region, at another end in the winding axis direction, constituted by the first negative-electrode non-forming region that has been wound, wherein the first electrode body further has two sheet-shaped lithium ion supply sources that adjoin the front face and the rear face of the first wound body, respectively, in a manner sandwiching the first wound body; and a second electrode body comprising:
- a second positive electrode which has a second positive electrode collector being a metal foil, as well as a second positive-electrode active material layer formed on the second positive electrode collector, and on which a second positive-electrode forming region where the second positive-electrode active material layer is formed on the second positive electrode collector, and a second positive-electrode non-forming region where the second positive-electrode active material layer is not formed on the second positive electrode collector, are formed;
- a second negative electrode which has a second negative electrode collector being a metal foil, as well as a second negative-electrode active material layer formed on the second negative electrode collector, and on which a second negative-electrode forming region where the second negative-electrode active material layer is formed on the second negative electrode collector, and a second negative-electrode non-forming region where the second negative-electrode active material layer is not formed on the second negative electrode collector, are formed; and
- a second separator which separates the second positive electrode and second negative electrode;

wherein the second electrode body is such that the second positive electrode, the second negative electrode, and the second separator are stacked and wound together into a flat-wound structure forming a second wound body shaped like a flat sheet having a front face and a rear face, and the second electrode body has a second wound positive-electrode non-forming region, at one end in a direction of a winding axis, constituted by the second positive-electrode non-forming region that has been wound, as well as a second wound negative-electrode non-forming region, at another end in the winding axis direction, constituted by the second negative-electrode non-forming region that has been wound, wherein the second electrode body further has two sheet-shaped lithium ion supply sources that adjoin the front face and the rear face of the second wound body, respectively, in a manner sandwiching the second wound body;

joining the first wound positive-electrode non-forming region to the first principal face, and joining the second wound positive-electrode non-forming region to the second principal face; and joining the first wound negative-electrode non-forming region to the third principal face, and joining the second wound negative-electrode non-forming region to the fourth principal face.

10. A method of manufacturing electrochemical device according to claim 9,
wherein, in a step to join the first wound positive-electrode non-forming region to the first principal face and join the second wound positive-electrode non-forming region to the second principal face, and in a step to join the first wound negative-electrode non-forming region to the third principal face and join the second wound negative-electrode non-forming region to the fourth principal face, joining is performed by means of ultrasonic joining.

11. A method of manufacturing electrochemical device according to claim 10,
wherein, in a step to join the first wound positive-electrode non-forming region to the first principal face and join the second wound positive-electrode non-forming region to the second principal face, the first wound positive-electrode non-forming region and second wound positive-electrode non-forming region are gripped by ultrasonic joining equipment to join the first wound positive-electrode non-forming region to the first principal face and join the second wound positive-electrode non-forming region to the second principal face; and wherein, in a step to join the first wound negative-electrode non-forming region to the third principal face and join the second wound negative-electrode non-forming region to the fourth principal face, the first wound negative-electrode non-forming region and second wound negative-electrode non-forming region are gripped by ultrasonic joining equipment to join the first wound negative-electrode non-forming region to the third principal face and join the second wound negative-electrode non-forming region to the fourth principal face.

* * * * *